United States Patent
Duan et al.

(10) Patent No.: US 12,198,310 B2
(45) Date of Patent: Jan. 14, 2025

(54) IMAGE PROCESSING METHOD FOR PERFORMING COLOR MIGRATION TO CORRECTION IMAGE ACCORDING TO REFERENCE IMAGE, AND OBTAINING FIRST SCRATCH IMAGE AND/OR SECOND SCRATCH IMAGE SO AS TO OBTAIN SCRATCH REPAIRING IMAGE

(71) Applicant: BOE Technology Group Co., Ltd., Beijing (CN)

(72) Inventors: Ran Duan, Beijing (CN); Dan Zhu, Beijing (CN); Yanhong Wu, Beijing (CN); Guannan Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/764,458

(22) PCT Filed: Mar. 22, 2021

(86) PCT No.: PCT/CN2021/082072
§ 371 (c)(1),
(2) Date: Mar. 28, 2022

(87) PCT Pub. No.: WO2022/198381
PCT Pub. Date: Sep. 29, 2022

(65) Prior Publication Data
US 2024/0062344 A1   Feb. 22, 2024

(51) Int. Cl.
*G06T 5/77* (2024.01)
*G06T 3/40* (2024.01)
(Continued)

(52) U.S. Cl.
CPC ............... *G06T 5/77* (2024.01); *G06T 3/40* (2013.01); *G06T 5/30* (2013.01); *G06T 5/50* (2013.01);
(Continued)

(58) Field of Classification Search
None
See application file for complete search history.

(56) References Cited

U.S. PATENT DOCUMENTS

2017/0295372 A1* 10/2017 Lawrence ............ H04N 19/182
2018/0025474 A1*  1/2018 Mei ........................ G06T 5/70
                                              382/275
(Continued)

FOREIGN PATENT DOCUMENTS

CN     104036467 A     9/2014
CN     108898567 A    11/2018
(Continued)

OTHER PUBLICATIONS

John C. Russ, The Image Processing Handbook, Chapter 3 "Correcting Image Defects", CRC Press, 2011 (Year: 2011).*
X. Xu et al., "Color Cast Detection and Color Correction Methods Based on Image Analysis", Measurement and Control Technology, vol. 27, No. 5, 2008; English Translation Attached.

*Primary Examiner* — Henok Shiferaw
(74) *Attorney, Agent, or Firm* — Intellectual Valley Law, P.C.

(57) ABSTRACT

An image processing method and an image processing device are provided. The image processing method includes performing at least one of a scratch repairing step, a dead point repairing step, a denoising step and a color cast correcting step on a to-be-processed video frame. According to the embodiments of the present disclosure, it is able to repair a scratch and a dead point, remove a noise and/or correct color cast for a video frame, thereby to improve a display effect of the video frame.

20 Claims, 20 Drawing Sheets

(51) Int. Cl.
   *G06T 5/30*    (2006.01)
   *G06T 5/50*    (2006.01)
   *G06T 5/70*    (2024.01)
   *G06T 7/254*   (2017.01)
   *G06T 7/90*    (2017.01)

(52) U.S. Cl.
   CPC ............... *G06T 5/70* (2024.01); *G06T 7/254* (2017.01); *G06T 7/90* (2017.01); *G06T 2207/10016* (2013.01); *G06T 2207/10024* (2013.01); *G06T 2207/20016* (2013.01); *G06T 2207/20032* (2013.01); *G06T 2207/20081* (2013.01); *G06T 2207/20084* (2013.01); *G06T 2207/20224* (2013.01)

(56) References Cited

U.S. PATENT DOCUMENTS

2020/0051217 A1\* 2/2020 Shen ........................ G06T 5/60
2021/0327034 A1\* 10/2021 Huang ..................... G06T 5/70

FOREIGN PATENT DOCUMENTS

| CN | 109934790 | A  | 6/2019  |
| CN | 111738952 | A  | 10/2020 |
| CN | 112102212 | A  | 12/2020 |
| EP | 2961169   | A1 | 12/2015 |

\* cited by examiner

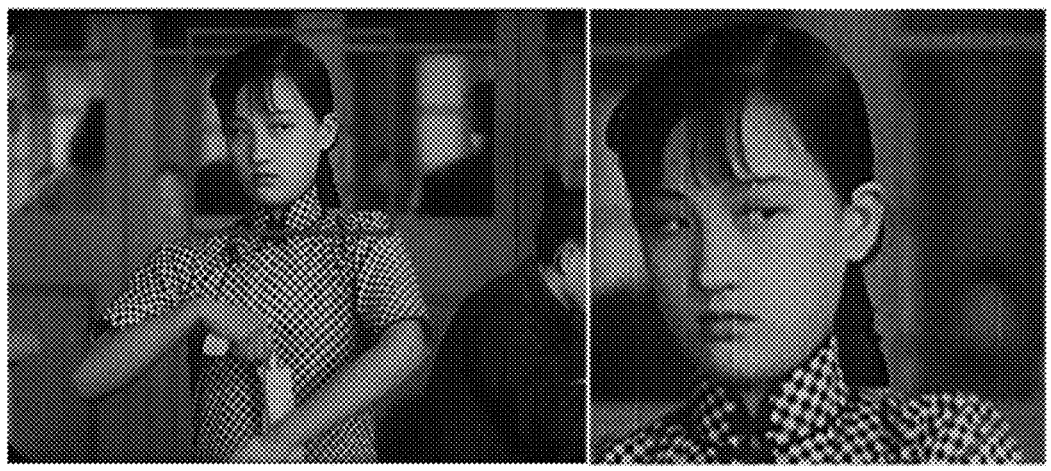
(a)
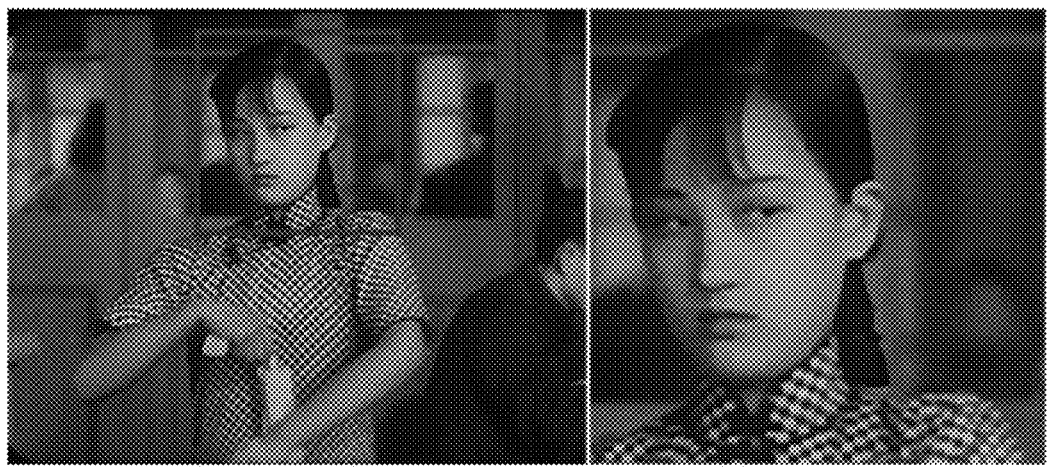
(b)
Fig.3

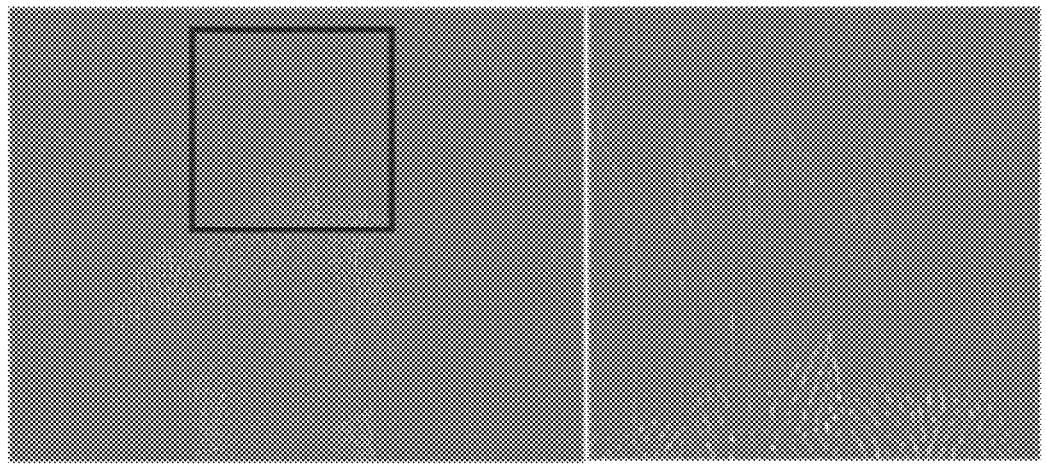
(a)
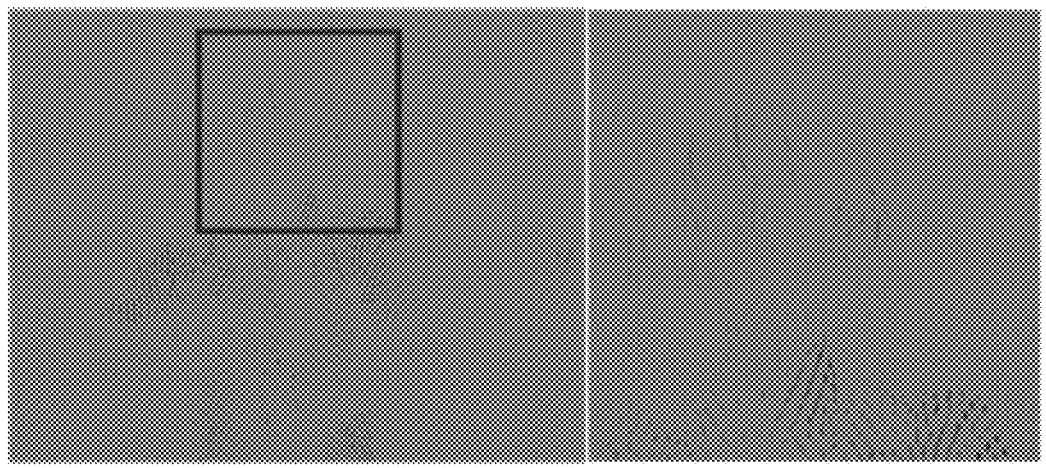
(b)
Fig.4

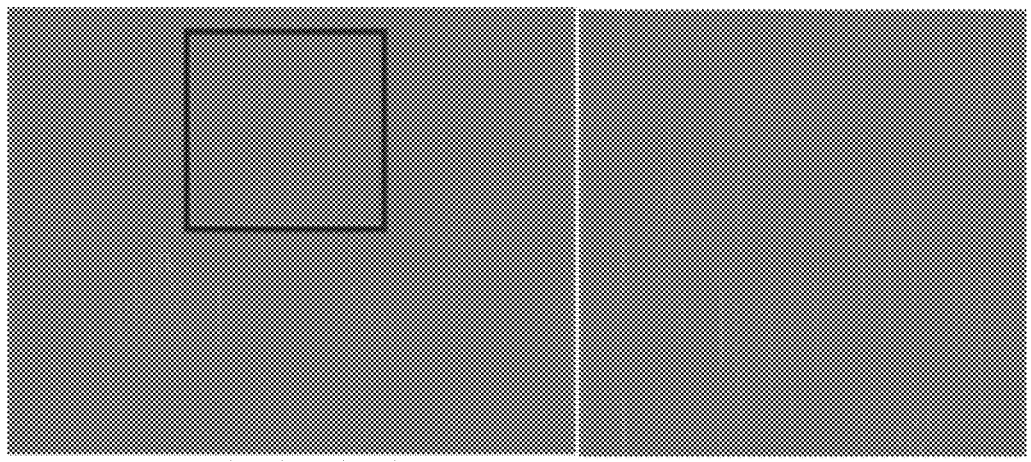
(a)
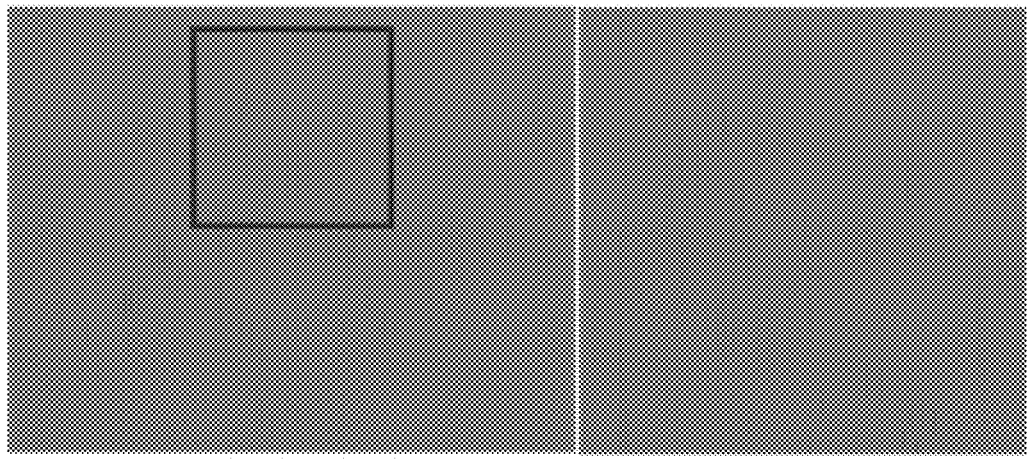
(b)
Fig.5

(a)
(b)
Fig.6 denoising the to-be-processed video frame through a denoising network, the denoising network being obtained through obtaining a target non-movement mask in accordance with consecutive $N_2$ video frames including a to-be-denoised video frame, and training a to-be-trained denoising network in accordance with the $N_2$ video frame and the target non-movement mask to obtain the denoising network — 141

Fig.14

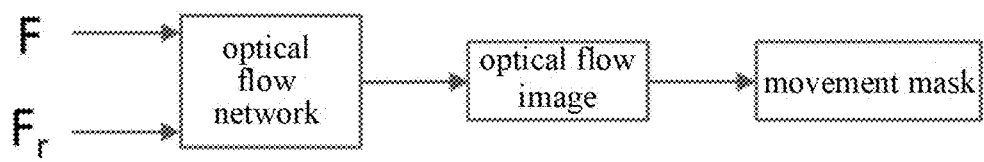

Fig.15

IMAGE PROCESSING METHOD FOR PERFORMING COLOR MIGRATION TO CORRECTION IMAGE ACCORDING TO REFERENCE IMAGE, AND OBTAINING FIRST SCRATCH IMAGE AND/OR SECOND SCRATCH IMAGE SO AS TO OBTAIN SCRATCH REPAIRING IMAGE

CROSS-REFERENCE TO RELATED APPLICATION

This application is the U.S. national phase of PCT application No. PCT/CN2021/082072 filed on Mar. 22, 2021, which is incorporated herein by reference in its entirety.

TECHNICAL FIELD

The present disclosure relates to the field of display technology, in particular to an image processing method and an image processing device.

BACKGROUND

Such problems as scratches, dead points, noises or color cast, may occur for video frames, such as cine films, when the video frames are used for a long term or badly kept. There is an urgent need to repair these video frames so as to improve a display effect.

SUMMARY

An object of the present disclosure is to provide an image processing method and an image processing device, so as to repair the scratches and dead points, remove the noise and/or correct the color cast for the video frames, thereby to improve the display effect.

In order to solve the above-mentioned problems, the present disclosure provides the following technical solutions.

In one aspect, the present disclosure provides in some embodiments an image processing method, including performing at least one of the following steps on a to-be-processed video frame: a scratch repairing step of subjecting the to-be-processed video frame to scratch removal to obtain a first image, performing variance calculation on the to-be-processed video frame and the first image to obtain a variance image, processing the variance image to obtain a scratch image where merely a scratch is reserved, and obtaining a scratch-repaired image in accordance with the to-be-processed video frame and the scratch image; a dead point repairing step of obtaining consecutive $N_1$ video frames, the $N_1$ video frames including the to-be-processed video frame, at least one video frame before the to-be-processed video frame and at least one video frame after the to-be-processed video frame, filtering the to-be-processed video frame in accordance with the at least one video frame before the to-be-processed video frame and at least one video frame after the to-be-processed video frame to obtain a dead-point-repaired image, and subjecting the dead-point-repaired image to artifact removal in accordance with the at least one video frame before the to-be-processed video frame and the at least one video frame after the to-be-processed video frame to obtain an artifact-repaired image; a denoising step of denoising the to-be-processed video frame through a denoising network, the denoising network being obtained through obtaining a target non-movement mask in accordance with consecutive $N_2$ video frames including a to-be-denoised video frame, and training a to-be-trained denoising network in accordance with the $N_2$ video frame and the target non-movement mask to obtain the denoising network; and a color cast correcting step of determining respective target color cast values of RGB channels of the to-be-processed video frame, performing color balance adjustment on the to-be-processed video frame in accordance with the target color cast values to obtain a first corrected image, and performing color migration on the first corrected image in accordance with a reference image to obtain a second corrected image.

In another aspect, the present disclosure provides in some embodiments an image processing device, including a processing module including at least one of: a scratch repairing sub-module configured to subject the to-be-processed video frame to scratch removal to obtain a first image, perform variance calculation on the to-be-processed video frame and the first image to obtain a variance image, process the variance image to obtain a scratch image where merely a scratch is reserved, and obtain a scratch-repaired image in accordance with the to-be-processed video frame and the scratch image; a dead point repairing sub-module configured to obtain consecutive $N_1$ video frames, the $N_1$ video frames including the to-be-processed video frame, at least one video frame before the to-be-processed video frame and at least one video frame after the to-be-processed video frame, filter the to-be-processed video frame in accordance with the $N_1$ video frames to obtain a dead-point-repaired image, and subject the dead-point-repaired image to artifact removal in accordance with the at least one video frame before the to-be-processed video frame and the at least one video frame after the to-be-processed video frame to obtain an artifact-repaired image; a denoising sub-module configured to denoise the to-be-processed video frame through a denoising network, the denoising network being obtained through obtaining a target non-movement mask in accordance with consecutive $N_2$ video frames including a to-be-denoised video frame, and training a to-be-trained denoising network in accordance with the $N_2$ video frame and the target non-movement mask to obtain the denoising network; and a color cast correction sub-module configured to determine respective target color cast values of RGB channels of the to-be-processed video frame, perform color balance adjustment on the to-be-processed video frame to obtain a first corrected image, and perform color migration on the first corrected image in accordance with a reference image to obtain a second corrected image.

In yet another aspect, the present disclosure provides in some embodiments an electronic device, including a processor, a memory, and a program or instruction stored in the memory and configured to be executed by the processor. The program or instruction is configured to be executed by the processor so as to implement the steps of the above-mentioned image processing method.

In still yet another aspect, the present disclosure provides in some embodiments a machine-readable storage medium storing therein a program or instruction. The program or instruction is executed by a processor so as to implement the steps of the above-mentioned image processing method.

According to the embodiments of the present disclosure, it is able to repair the scratches and dead points, remove the noise and/or correct the color cast for the video frame, thereby to improve a display effect of the video frame.

BRIEF DESCRIPTION OF THE DRAWINGS

Through reading the detailed description hereinafter, the other advantages and benefits will be apparent to a person

FIG. 3 is a schematic view showing a to-be-processed video and a first image according to an embodiment of the present disclosure;

FIG. 4 is a schematic view showing a first variance image and a second variance image according to an embodiment of the present disclosure;

FIG. 5 is a schematic view showing a first scratch image and a second scratched image according to an embodiment of the present disclosure;

FIG. 6 is a schematic view showing comparison between the to-be-processed video frame and a scratch-repaired image according to an embodiment of the present disclosure;

FIG. 14 is a flow chart of a denoising step according to an embodiment of the present disclosure;

FIG. 15 is a schematic view showing a process of obtaining a movement mask through an optical flow network according to an embodiment of the present disclosure;

DETAILED DESCRIPTION

Figure 1:
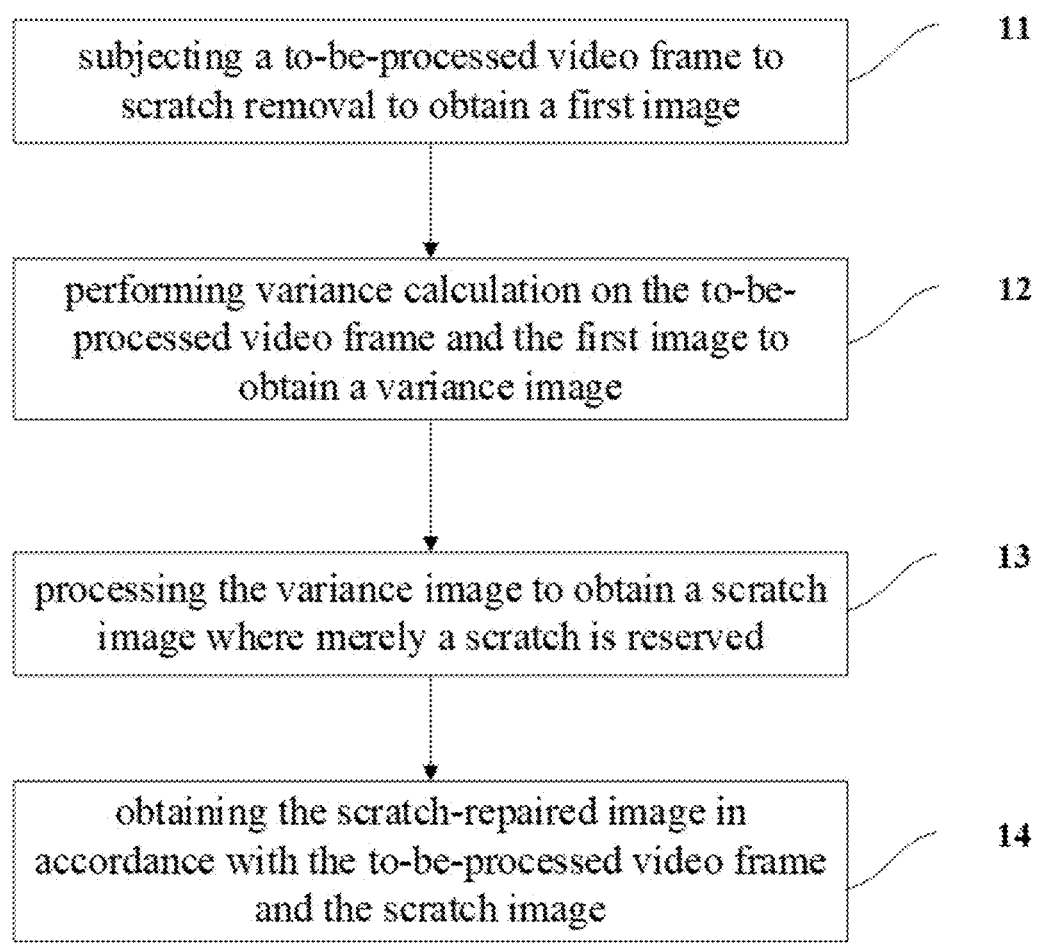
FIG. 1 is a flow chart of a scratch repairing step according to an embodiment of the present disclosure.

In the following, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

The present disclosure provides in some embodiments an image processing method, which includes performing at least one of the following steps on a to-be-processed video frame: a scratch repairing step of subjecting the to-be-processed video frame to scratch removal to obtain a first image, performing variance calculation on the to-be-processed video frame and the first image to obtain a variance image, processing the variance image to obtain a scratch image where merely a scratch is reserved, and obtaining a scratch-repaired image in accordance with the to-be-processed video frame and the scratch image; a dead point repairing step of obtaining consecutive $N_1$ video frames, the $N_1$ video frames including the to-be-processed video frame, at least one video frame before the to-be-processed video frame and at least one video frame after the to-be-processed video frame, filtering the to-be-processed video frame in accordance with the at least one video frame before the to-be-processed video frame and at least one video frame after the to-be-processed video frame to obtain a dead-point-repaired image, and subjecting the dead-point-repaired image to artifact removal in accordance with the at least one video frame before the to-be-processed video frame and the at least one video frame after the to-be-processed video frame to obtain an artifact-repaired image; a denoising step of denoising the to-be-processed video frame through a denoising network, the denoising network being obtained through obtaining a target non-movement mask in accordance with consecutive $N_2$ video frames including a to-be-denoised video frame, and training a to-be-trained denoising network in accordance with the $N_2$ video frame and the target non-movement mask to obtain the denoising network; and a color cast correcting step of determining respective target color cast values of RGB channels of the to-be-processed video frame, performing color balance adjustment on the to-be-processed video frame in accordance with the target color cast values to obtain a first corrected image, and performing color migration on the first corrected image in accordance with a reference image to obtain a second corrected image.

It should be appreciated that, at least one of the above four steps may be performed on the video frame. When a plurality of steps needs to be performed, an order of these steps will not be particularly defined. For example, when the scratch repairing step and the dead point repairing step need to be performed, the scratch repairing step may be performed prior to, or subsequent to, the dead point repairing step.

According to the embodiments of the present disclosure, at least one of the scratch repairing step, the dead point repairing step, the denoising step and the color cast correcting step is formed on the video frame, so as to improve a display effect of the video frame.

The above four steps will be described hereinafter.

1. Scratch Repairing

As shown in FIG. 1, the scratch repairing step includes the following steps.

Step 11: subjecting the to-be-processed video frame to scratch removal to obtain the first image.

In the embodiments of the present disclosure, the to-be-processed video frame may be subjected to filtration, e.g., median filtration, to remove scratches.

Step 12: performing variance calculation on the to-be-processed video frame and the first image to obtain the variance image.

Step 13: processing the variance image to obtain the scratch image where merely the scratch is reserved.

Step 14: obtaining the scratch-repaired image in accordance with the to-be-processed video frame and the scratch image.

In the embodiments of the present disclosure, the individual to-be-processed video frame is subjected to scratch removal to obtain an image where the scratch has been removed. Next, the variance calculation is performed in accordance with the to-be-processed video frame and the image where the scratch has been removed to obtain the variance image including the scratch and image details. Next, the variance image is processed again to filter out the image details and obtain the scratch image where the scratch is reserved. Then, the scratch-repaired image where the scratch has been removed is obtained in accordance with the to-be-processed video frame and the scratch image. As a result, it is able to prevent the image resolution from being adversely affected while removing the scratch.

The above steps will be described hereinafter in details.

(1) Step 11

In a possible embodiment of the present disclosure, the subjecting the to-be-processed video frame to scratch removal includes performing median filtration on the to-be-processed video frame in accordance with at least one of a type of a filter and a type of the scratch in the to-be-processed video frame, so as to obtain the image where the scratch has been removed.

In a possible embodiment of the present disclosure, the performing median filtration on the to-be-processed video frame in accordance with at least one of the type of the filter and the type of the scratch in the to-be-processed video frame includes selecting a corresponding type of a filter in accordance with the type of the scratch in the to-be-processed video frame, so as to perform median filtration on the to-be-processed video frame. When the scratch in the to-be-processed video frame is a vertical scratch, the median filtration is performed on the to-be-processed video frame through a median filter in a horizontal direction, and when the scratch in the to-be-processed video frame is a horizontal scratch, the media filtration is performed on the to-be-processed video frame through a median filter in a vertical direction.

In other words, in the embodiments of the present disclosure, the median filter is determined in accordance with the direction of the scratch in the to-be-processed video frame.

It should be noted that, in some other embodiments of the present disclosure, the median filter is not changed, and instead, the to-be-processed video frame is rotated so that the scratch in the to-be-processed video frame matches the median filter.

In other words, the performing median filtration on the to-be-processed video frame in accordance with at least one of the type of the filter and the type of the scratch in the to-be-processed video frame includes: performing a respective preprocessing on the to-be-processed video frame in accordance with the type of the filter and the type of the scratch in the to-be-processed video frame, and then performing median filtration on the preprocessed to-be-processed video frame.

When the median filter in the horizontal direction is adopted and the scratch in the to-be-processed video frame is a non-vertical scratch, the to-be-processed video frame is rotated so as to convert the scratch into a vertical scratch. The non-vertical scratch includes a horizontal scratch and an oblique scratch. It should be noted that, when the scratch in the to-be-processed video frame is the vertical scratch, it is unnecessary to rotate the to-be-processed video frame.

When the median filter in the vertical direction is adopted and the scratch in the to-be-processed video frame is a non-horizontal scratch, the to-be-processed video frame is rotated so as to convert the scratch into a horizontal scratch. The non-horizontal scratch includes a vertical scratch and an oblique scratch. It should be noted that, when the scratch in the to-be-processed video frame is the horizontal scratch, it is unnecessary to rotate the to-be-processed video frame.

In addition, when the to-be-processed video frame includes both the horizontal scratch and the vehicle scratch, the media filtration is performed on the to-be-processed video frame through both the median filter in the horizontal direction and the median filter in the vertical direction. For example, the median filtration is performed on the to-be-processed video frame in the horizontal direction and then in the vertical direction, or the median filtration is performed on the to-be-processed video frame in the vertical direction and then in the horizontal direction.

In the embodiments of the present disclosure, the subjecting the to-be-processed video frame to scratch removal includes performing median filtration on the to-be-processed video frame through a median filter having a size of 1*k and/or k*1. The median filter having a size of 1*k is a median filter in the horizontal direction, and the median filter having a size of k*1 is a median filter in the vertical direction.

For example, a to-be-processed video frame I is filtered through the median filter having a size of 1*k, so as to obtain a first image $I_{median}$, and $I_{median}=M_{1\times k}(I)$, where $M_{1\times k}(x)$ represents the filtration on x through the median filter having a size of 1*k.

How to determine the size of the filter will be described hereinafter.

In a possible embodiment of the present disclosure, prior to subjecting the to-be-processed video frame to scratch removal, the image processing method further includes increasing a value of k of the median filter gradually from a predetermined value and performing median filtration on the to-be-processed video frame to obtain a second image; and determining a final value of k in accordance with a filtering effect of the second image.

For example, when the median filter having a size of 1*k in the horizontal direction is adopted, at first the value of k of the median filter is set as 3 (the predetermined value), i.e., the median filter having a size of 1*3 is adopted to filter the to-be-processed video frame, so as to obtain a second image. Next, the filtering effect of the second image is observed, and when a scratch removal effect is not obvious, the value of k is set as 4 (or any other value greater than 3), i.e., the median filter having a size of 1*4 is adopted to filter the to-be-processed video frame, so as to obtain the second image. Next, the filtering effect of the second image is observed, and when the scratch removal effect is not obvious, the value of k is increased again, until there is no obvious scratch in the second image.

It should be noted that, in some embodiments of the present disclosure, the value of k is determined directly in accordance with a thickness of the scratch. For example, for an image having a resolution of 2560*1440, k is set as a value of smaller than 11.

Figure 2:
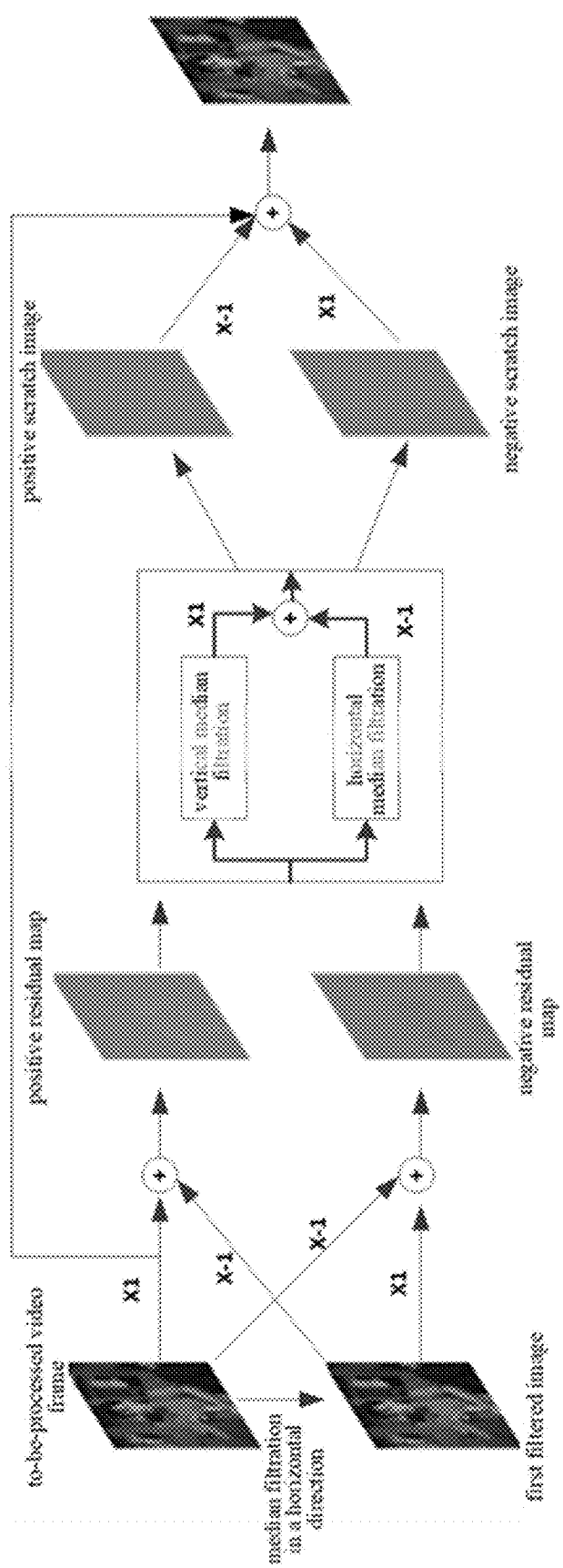
FIG. 2 is a schematic view showing a specific process of the scratch repairing step according to an embodiment of the present disclosure.

The description will be given as follows. As shown in FIG. 3(a), which shows the to-be-processed image and a partial enlarged view of the to-be-processed video frame, the to-be-processed video frame includes the vertical scratch. As shown in FIG. 2, the to-be-processed video frame is subjected to scratch removal through the median filter in the horizontal direction, so as to obtain the first image. As shown in FIG. 3(b), which shows the first image and a partial enlarged view of the first image, the vertical scratch has been removed from the first image, but the first image is blurrier than the to-be-processed video frame.

(2) Step 12

In the embodiments of the present disclosure, the performing variance calculation on the to-be-processed video frame and the first image includes performing variance calculation on the to-be-processed video frame and the first image to obtain a first variance image and/or a second variance image. The first variance image is obtained through subtracting the first image from the to-be-processed video frame, and the second variance image is obtained through subtracting the to-be-processed video frame from the first image.

In the embodiments of the present disclosure, when one image is subtracted from another image, it means that a pixel at a position in the one image is subtracted from a pixel at a position that is in the other image and corresponds to the position in the one image.

The first variance image is a white texture image including the image details and the scratch, and the second variance image is a black texture image including the image details and the scratch.

In the embodiments of the present disclosure, the first variance image is also called as a positive residual image, and the second variance image is also called as a negative residual image.

For example, the to-be-processed video frame I is subtracted from the first image $I_{median}$, and the first image $I_{median}$ is subtracted from the to-be-processed video frame I through the following equations so as to obtain a positive residual $Err_{white}$ and a negative residual $Err_{black}$: $Err_{white}=I-I_{median}$ and $Err_{black}=I_{median}-I$, where the positive residual and the negative residual are both positive values.

Still taking FIG. 2 as an example, the to-be-processed video frame is subtracted from the first image and the first image is subtracted from the to-be-processed video frame. To be specific, a value obtained through multiplying the to-be-processed video frame by 1(×1) is added to a value obtained through multiplying the first image by −1(×−1), i.e., the first image is subtracted from the to-be-processed video frame, so as to obtain the first variance image. A value obtained through multiplying the to-be-processed video frame by −1 (×−1) is added to a value obtained through multiplying the first image by 1(×1), i.e., the to-be-processed video frame is subtracted from the first image, so as to obtain the second variance image. As shown in FIG. 4, FIG. 4(a) shows the first variance image and a partial enlarged view of the first variance image, and FIG. 4(b) shows the second variance image and a partial enlarged view of the second variance image. It can be seen that, the first variance image is a white texture image including the image details and the scratch, and the second variance image is a black texture image including the image details and the scratch.

In the embodiments of the present disclosure, the first variance image and the second variance image are calculated simultaneously. It should be noted that, in some other embodiments of the present disclosure, merely the first variance image or the second variance image may be calculated.

(3) Step 13

In the embodiments of the present disclosure, the processing the variance image to obtain the scratch image where merely the scratch is reserved includes: processing the first variance image to obtain a first scratch image where merely the scratch is reserved, and/or processing the second variance image to obtain a second scratch image where merely the scratch is reserved.

The scratch image is an image where the image details are filtered and merely the scratch is reserved.

In the embodiments of the present disclosure, the first scratch image is also called as a positive scratch image and the second scratch image is also called as a negative scratch image.

In a possible embodiment of the present disclosure, the processing the first variance image to obtain the first scratch image where merely the scratch is reserved includes: performing median filtration on the first variance image through the median filter in the vertical distance and the median filter in the horizontal direction, so as to obtain a first vertically-filtered image and a first horizontally-filtered image; when the scratch in the to-be-processed video frame is the vertical scratch, subtracting the first horizontally-filtered image from the first vertically-filtered image to obtain the first scratch image; and when the scratch in the to-be-processed video frame is the horizontal scratch, subtracting the first vertically-filtered image from the first horizontally-filtered image to obtain the first scratch image.

For example, when the scratch in the to-be-processed video frame is the vertical scratch, Err white (the first variance image) is subjected to median filtration in the vertical direction and median filtration in the horizontal direction, so as to obtain the first vertically-filtered image $M_{n\times1}(Err_{white})$ and the first horizontally-filtered image $M_{1\times n}(Err_{white})$. Then, the first horizontally-filtered image $M_{1\times n}(Err_{white})$ is subtracted from the first vertically-filtered image $M_{n\times1}(Err_{white})$ to obtain the filtered first scratch image $L_{white}$. At this time, the first scratch image is represented as a positive value, i.e., $L_{white}=M_{n\times1}(Err_{white})-M_{1\times n}(Err_{white})$, where $M_{n\times1}(Err_{white})$ represents the median filtration on the first variance image in the vertical direction, and $M_{1\times n}(Err_{white})$ represents the median filtration on the first variance image in the horizontal direction.

The processing the second variance image to obtain the second scratch image where merely the scratch is reserved includes: performing median filtration on the second variance image through the median filter in the vertical distance and the median filter in the horizontal direction, so as to obtain a second vertically-filtered image and a second horizontally-filtered image; when the scratch in the to-be-processed video frame is the vertical scratch, subtracting the second horizontally-filtered image from the second vertically-filtered image to obtain the second scratch image; and when the scratch in the to-be-processed video frame is the horizontal scratch, subtracting the second vertically-filtered image from the second horizontally-filtered image to obtain the second scratch image.

For example, when the scratch in the to-be-processed video frame is the vertical scratch, $\text{Err}_{black}$ (the second variance image) is subjected to median filtration in the vertical direction and median filtration in the horizontal direction, so as to obtain the second vertically-filtered image $M_{n\times 1}(\text{Err}_{black})$ and the second horizontally-filtered image $M_{1\times n}(\text{Err}_{black})$. Then, the second horizontally-filtered image $M_{1\times n}(\text{Err}_{black})$ is subtracted from the second vertically-filtered image $M_{n\times 1}(\text{Err}_{black})$ to obtain the respective filtered second scratch image $L_{black}$. At this time, the second scratch image is represented as a positive value, i.e., $L_{black}=M_{n\times 1}(\text{Err}_{black})-M_{1\times n}(\text{Err}_{black})$, where $M_{n\times 1}(\text{Err}_{black})$ represents the median filtration on the second variance image in the vertical direction, and $M_{1\times n}(\text{Err}_{black})$ represents the median filtration on the second variance image in the horizontal direction.

In the embodiments of the present disclosure, usually a length of the scratch is greater than a length of a line in the image details, so n in the median filter in the vertical direction and in in the median filter in the horizontal direction may be set as a large value so as to filter the image details and merely reserve the scratch. For example, the value of n may be a half of an average length of the scratch. When a maximum length of the scratch is 180, the value of n may be 80 to 100.

Still taking FIG. 2 as an example, each of the first variance image and the second variance image is subjected to median filtration in the vertical direction and median filtration in the horizontal direction, so as to obtain the vertically-filtered image and the horizontally-filtered image. The scratch in the to-be-processed video frame in FIG. 2 is the vertical scratch, so it is necessary to subtract the horizontally-filtered image from the vertically-filtered image, so as to obtain the first scratch image and the second scratch image. As shown in FIG. 5, FIG. 5(a) shows the first scratch image and a partial enlarged view of the first scratch image, and FIG. 5(b) shows the second scratch image and a partial enlarged view of the second scratch image. It can be seen that, the first scratch image is an image including a white scratch, and the second scratch image is an image including a black scratch.

(4) Step 14

The obtaining the scratch-repaired image in accordance with the to-be-processed video frame and the scratch image includes: performing operation on the to-be-processed video frame, the first scratch image and/or the second scratch image to obtain the scratch-repaired image.

In the embodiments of the present disclosure, the scratch-repaired image is calculated through the following equation $I_{deline}=I-L_{white}-(L_{black}\times -1)=I-L_{white}+L_{black}$, where $I_{deline}$ represents the scratch-repaired image, I represents the to-be-processed video frame, $L_{white}$ represents the first scratch image, and $L_{black}$ represents the second scratch image. In this equation, the second scratch image $L_{black}$ has a positive value, so it is necessary to multiply it by $-1$ to convert it into a negative value.

In the embodiments of the present disclosure, when calculating the scratch-repaired image, merely the first scratch image or the second scratch image may also be used.

The scratch-repaired image is subtracted from the to-be-processed video frame so as to remove the scratch and maintain the resolution of the image. FIG. 6(a) shows the to-be-processed video frame and a partial enlarged view of the to-be-processed video frame, and FIG. 6(b) shows the scratch-repaired image and a partial enlarged view of the scratch-repaired image. As shown in FIG. 6, the scratch in the scratch-repaired image has been removed, and as compared with the to-be-processed video frame, the resolution does not change.

2. Dead Point Repairing

Figure 7:
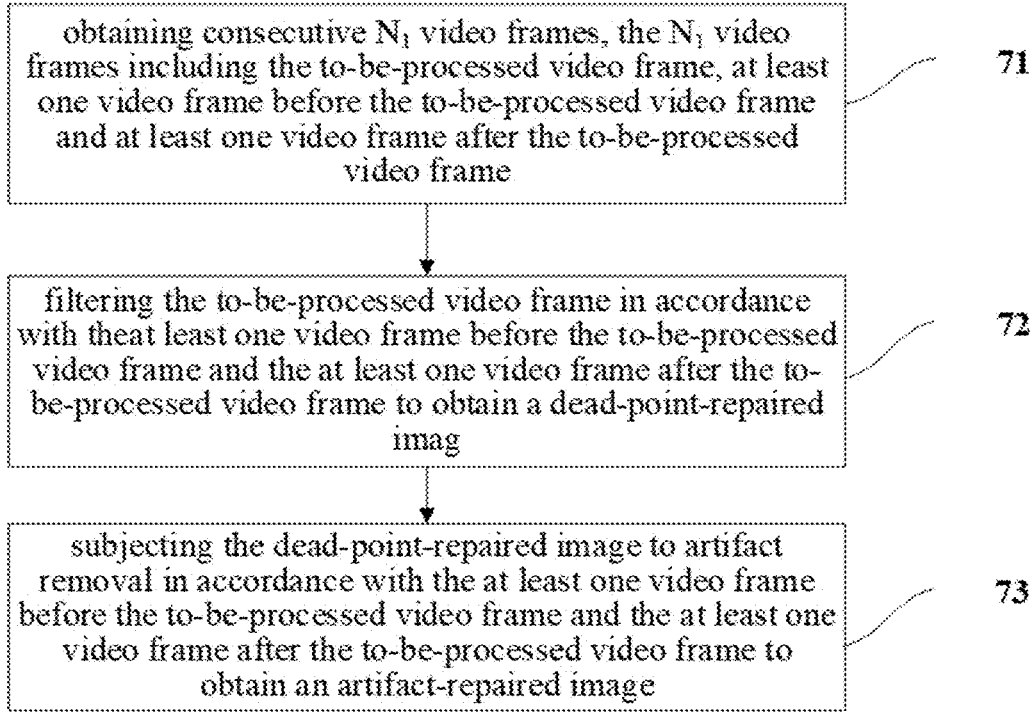
FIG. 7 is a flow chart of a dead-pixel repairing step according to an embodiment of the present disclosure.

As shown in FIG. 7, the dead point repairing step includes the following steps.

Step 71: obtaining consecutive $N_1$ video frames, the $N_1$ video frames including the to-be-processed video frame, at least one video frame before the to-be-processed video frame and at least one video frame after the to-be-processed video frame.

In the embodiments of the present disclosure, $N_1$ is a positive integer greater than or equal to 3, and it may be set according to the practical need, e.g., 3.

Step 72: filtering the to-be-processed video frame in accordance with the at least one video frame before the to-be-processed video frame and the at least one video frame after the to-be-processed video frame to obtain a dead-point-repaired image.

Step 73: subjecting the dead-point-repaired image to artifact removal in accordance with the at least one video frame before the to-be-processed video frame and the at least one video frame after the to-be-processed video frame to obtain an artifact-repaired image.

The to-be-processed video frame is subjected to dead point removal in accordance with a plurality of video frames, so a movement artifact is introduced into the resultant dead-point-repaired image. At this time, it converts the problem of dead pixel removal into a problem of artifact removal, i.e., both the dead point in the video frame is filtered and the artifact is removed through a multiscale cascade network, so as to repair the dead point in the video frame.

In other words, the dead point repairing step includes two procedures, i.e., a dead point removing step and an artifact removing step, which will be described hereinafter.

(1) Dead Point Removal

In the embodiments of the present disclosure, a method for repairing the dead point may be used to repair a dead point in a cine film, or in any other type of video frame.

Dead point is a common damage to the cine film, and it is a white or black block-like spot formed when gel at a surface of the cine film is lost or a contaminant occurs at the surface of the cine film. Usually, the dead point in the cine film has the following three characteristics.

1. There is a very tiny difference between pixel grayscales inside the dead point, and the grayscales in each block substantially remain the same.

2. The dead point is not continuous in a time domain and a space domain. This damage is randomly distributed within one frame, and the dead point is unlikely to repeat at a same position in two adjacent frames, so it is presented as a pulse damage in the time domain. Usually, within one frame, there is a relatively large difference between the grayscale at a dead point region and a background grayscale, so the dead point may be observed by human eyes.

3. Spatial proximity, i.e., when a certain pixel is located in the dead point, pixels around the pixel is likely to be located in the dead point region.

In the embodiments of the present disclosure, the dead point is repaired on the basis of the second characteristic. The dead point is not continuous in the time domain and pixel values at a same position in adjacent frames usually proximate to each other, so in the embodiments of the present disclosure, the dead point in a current image is repaired in accordance with contents in the images before and after the current image.

In a possible embodiment of the present disclosure, median filtration is performed on the to-be-processed video frame in accordance with at least one video frame before the to-be-processed video frame and at least one video frame after the to-be-processed video frame, so as to obtain the dead-point-repaired image. For example, when $N_1$ is 3, with respect to a current to-be-processed video frame $I^t$ and adjacent images $I^{t-1}$ and $I^{t+1}$, a median is calculated for pixels one by one. Usually, there is not a too large difference between the pixel values at a same position of the adjacent images in a same scenario, so during the calculation, the dead point region whose grayscale is greatly different from the surrounding background grayscale is replaced with the pixels in the image before or after the current to-be-processed video frame, so it is able to remove the dead point in the current to-be-processed video frame.

It should be noted that, in some other embodiments of the present disclosure, the dead point in the to-be-processed video frame may be removed through any other filtration method, e.g., mean filtration.

Figure 8:
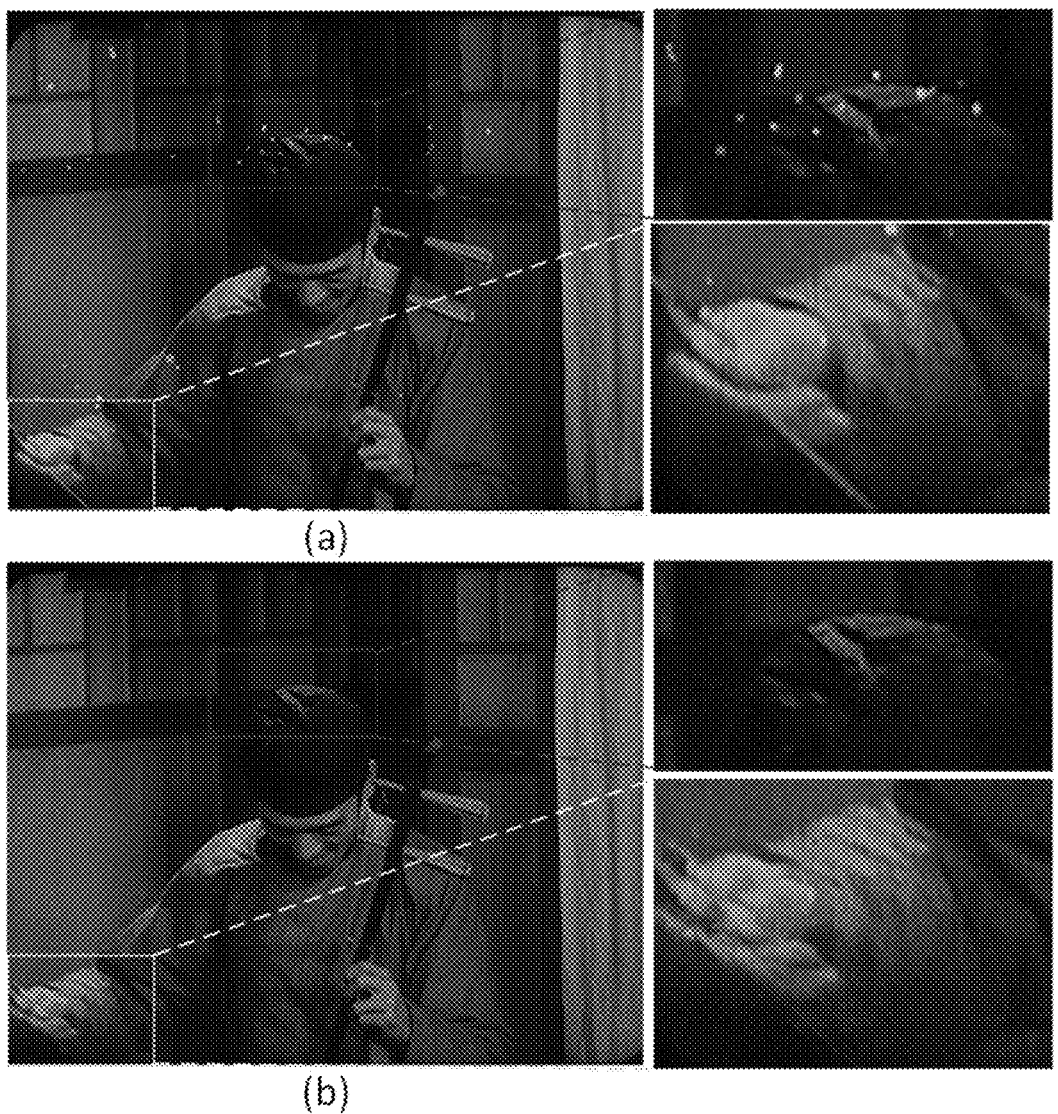
FIG. 8 is a schematic view showing comparison between the to-be-processed video frame and the dead-point-repaired image according to an embodiment of the present disclosure.

As shown in FIG. 8, FIG. 8(a) shows the to-be-processed video frame with the dead point, and FIG. 8(b) shows the dead-point-repaired image. It can be seen that, the dead point in the current image is repaired through the contents in the images before and after the current image through mean filtration, but the movement artifact also occurs when wrong information in these images is introduced into the current image. In FIG. 8(a), a figure at an upper right corner is an enlarged view of the dead point zone, and in FIG. 8(b), a figure at an upper right corner is an enlarged view of a region where the dead point has been repaired and a figure at a lower right corner is an enlarged view of the movement artifact. Hence, in the embodiments of the present disclosure, it is also necessary to subject the dead-point-repaired image to artifact removal, so as to remove the artifact generated due to the filtration.

(2) Artifact Removal

In a possible embodiment of the present disclosure, the subjecting the dead-point-repaired image to artifact removal in accordance with the at least one video frame before the to-be-processed video frame and the at least one video frame after the to-be-processed video frame to obtain an artifact-repaired image includes downsampling the dead-point-repaired image, the at least one video frame before the to-be-processed video frame and the at least one video frame after the to-be-processed video frame for $N_3$-1 times to obtain downsampled images having $N_3$-1 resolutions, and inputting images having $N_3$ resolutions into the multiscale cascade network for artifact removal so as to obtain the artifact-repaired image. Each of the downsampled images having respective $N_3$-1 resolutions comprises $N_1$ downsampled image frames corresponding to the dead-point-repaired image, the at least one video frame before the to-be-processed video frame, the at least one video frame after the to-be-processed video frame respectively; the images having the $N_3$ resolutions comprise the dead-point-repaired image, the at least one video frame before the to-be-processed video frame, the at least one video frame after the to-be-processed video frame, and the downsampled images having $N_3$-1 resolutions; the multiscale cascade network comprises $N_3$ cascaded sub-networks, and images processed by the $N_3$ cascaded sub-networks are generated respectively on the basis of the images having respective $N_3$ resolutions, where $N_3$ is a positive integer greater than or equal to 2.

Further, in a possible embodiment of the present disclosure, the inputting the images having $N_3$ resolutions into the multiscale cascade network for artifact removal to obtain the artifact-repaired image includes: with respect to a first sub-network in the $N_3$ cascaded sub-networks, downsampling for A-times the dead-point-repaired image, the at least one video frame before the to-be-processed video frame and the at least one video frame after the to-be-processed video frame to obtain $N_1$ first downsampled images, splicing each of the $N_1$ first downsampled images with a corresponding original image to obtain a first spliced image, and inputting the first spliced images into the first sub-network to obtain a first output image; with respect to an intermediate sub-network between the first sub-network and a last sub-network, upsampling an output image from a previous sub-network to obtain a first upsampled image, downsampling for B-times the dead-point-repaired image, the at least one video frame before the to-be-processed video frame and the at least one video frame after the to-be-processed video frame to obtain $N_1$ second downsampled images having a same scale as the first upsampled image, splicing two groups of images to obtain a second spliced image, and inputting the second spliced image into the intermediate sub-network to obtain a second output image, one of the two groups of images including the $N_1$ second downsampled images, and the other of the two groups of images including downsampled images in the $N_1$ second downsampled images other than a downsampled image corresponding to the dead-point-repaired image as well as the first upsampled image; and with respect to the last sub-network, upsampling an output image from a previous sub-network to obtain a second upsampled image having a same scale as the to-be-processed video frame, splicing two groups of images to obtain a third spliced image, and inputting the third spliced image into the last sub-network to obtain the artifact-repaired image, one of the two groups of images including the $N_1$ video frames, and the other of the two groups of images including images in the $N_1$ video frames other than the dead-point-repaired image as well as the second upsampled image.

In a possible embodiment of the present disclosure, the sub-network is an encoder-decoder resblock network structure proposed in SRN. It should be noted that, in some other embodiments of the present disclosure, any other network may also be adopted, which will not be particularly defined herein.

In order to improve an effect of the network, in a possible embodiment of the present disclosure, the $N_3$ cascaded sub-networks have a same structure but have different parameters.

In a possible embodiment of the present disclosure, $N_3$ is 3, A is 4 and B is 2.

The following description will be given illustratively.

Figure 9:
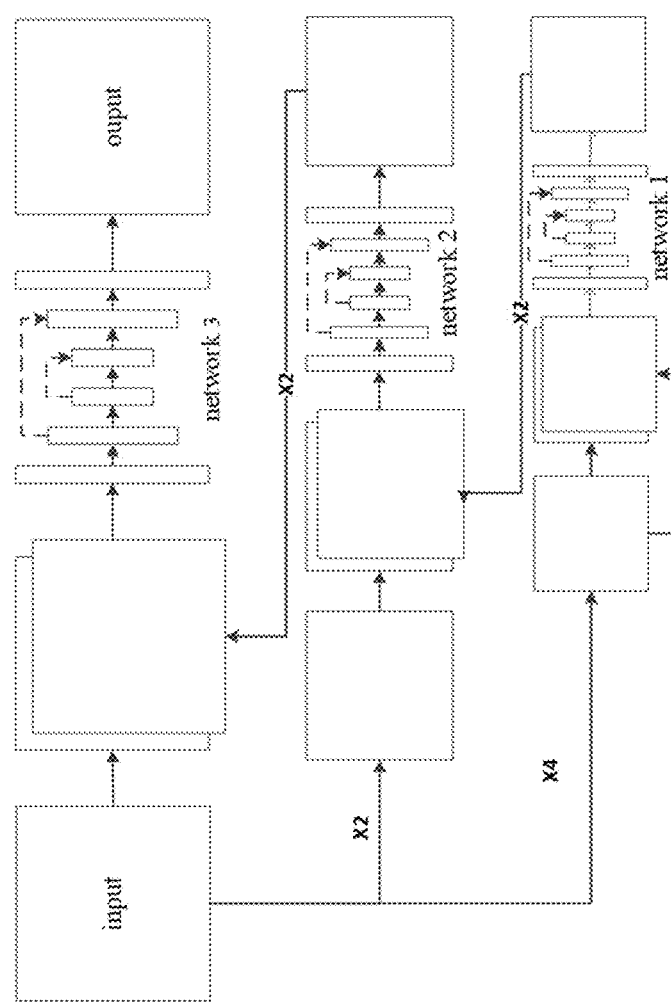
FIG. 9 is a schematic view showing a multiscale cascade network according to an embodiment of the present disclosure.

As shown in FIG. 9, the multiscale cascade network includes three cascaded sub-networks having a same structure and configured to process inputs at different scales (i.e., resolutions).

Figure 10:
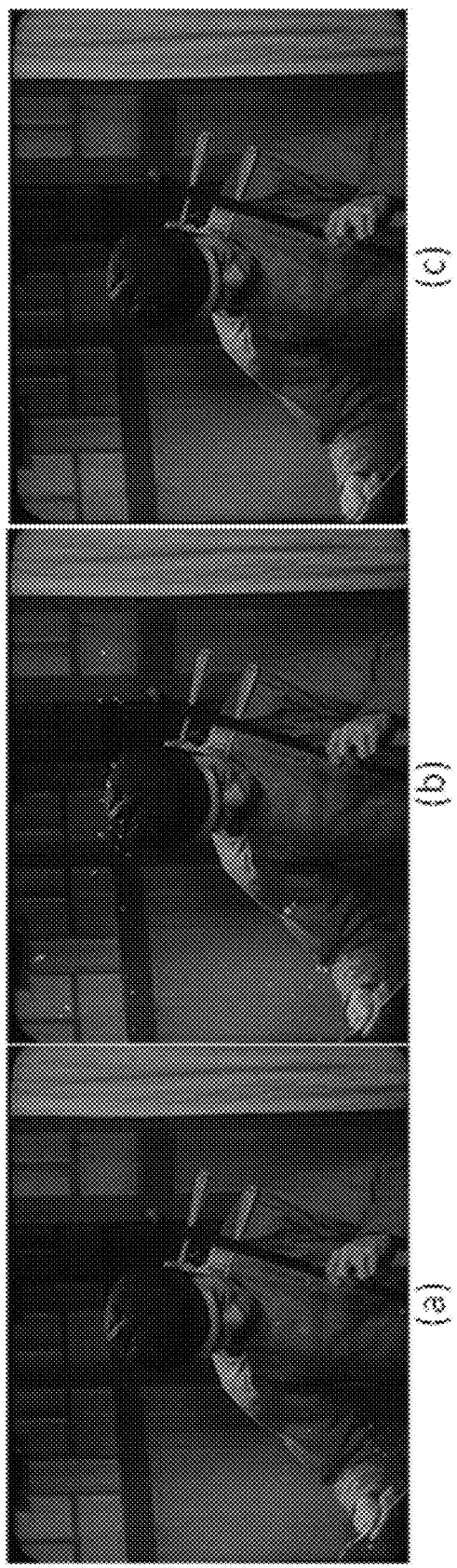
FIG. 10 is a schematic view showing input images of the multiscale cascade network according to an embodiment of the present disclosure.

The inputs of the multiscale cascade network are consecutive three images $I^{t-1}$, $I^t$ and $I^{t+1}$. As shown in FIG. 10, FIG. 10(b) shows the dead-point-repaired image with the artifact, FIG. 10(a) shows $I^{t-1}$, i.e., an image before the to-be-processed video frame $I^t$, and FIG. 10(c) shows $I^{t+1}$, i.e., an image after the to-be-processed video frame $I^t$. The multiscale cascade network outputs an artifact-removed image $I'_{out}{}^t$ corresponding to $I'^t$.

The operation of the multiscale cascade network will be described as follows.

1. The inputted three images $I^{t-1}$, $I'^t$ and $I^{t+1}$ are 4-times downsampled to respectively obtain first downsampled images $I_{in1}{}^{t-1}$, $I'_{in1}{}^t$ and $I_{in1}{}^{t+1}$ each having a resolution which is ¼ of the resolution of the original image. Next, each of the three first downsampled images is spliced with the original image to obtain a first spliced image. Then, the first spliced image is inputted into a network 1, and the network 1 outputs a first output image $I_{out1}{}^t$.

The above-mentioned "splicing" refers to splicing in a fourth dimension. Each image is a three-dimensional array having a structure of H*W*C, i.e., height*width*channel, and the fourth dimension is just the channel.

In a possible embodiment of the present disclosure, $I^{t-1}$, $I'^t$ and $I^{t+1}$ are 4-times downsampled through bicubic interpolation. It should be noted that, the downsampling may also be performed using any other method.

After the downsampling, the artifact in the image is reduced, so as to facilitate the elimination and repair of the artifact through the network. Hence, sizes of the input images of the three sub-networks are ¼, ½ and 1 times of sizes of the original input images respectively. Here, the image needs to be inputted into the first sub-network, so 4-times downsampling is performed.

2. The output $I_{out1}{}^t$ from the network 1 is 2-times upsampled to obtain a first upsampled image $I_{in2}{}^t$, and the images $I^{t-1}$, $I'^t$ and $I^{t+1}$ are 2-times downsampled to obtain the second downsampled images $I_{in2}{}^{t-1}$, $I'_{in2}{}^t$, and $I_{in2}{}^{t+1}$. The three second downsampled images are taken as one group of inputs, and $I_{in2}{}^{t-1}$, $I'_{in2}{}^t$ and $I_{in2}{}^{t+1}$ are taken as another group of inputs, and these two groups of inputs are spliced to obtain second spliced images. Then, the second spliced images are inputted into a network 2, and the network 2 outputs a second output $I_{out2}{}^t$.

In a possible embodiment of the present disclosure, $I_{out1}{}^t$ from the network 1 is 2-times upsampled through bicubic interpolation. It should be noted that, the upsampling may also be performed using any other method.

In a possible embodiment of the present disclosure, $I^{t-1}$, $I'^t$ and $I^{t+1}$ are 2-times downsampled through bicubic interpolation. It should be noted that, the downsampling may also be performed using any other method.

3. The output $I_{out2}$ from the network 2 is 2-times upsampled to obtain a second upsampled image $I_{in3}{}^t$. The images $I^{t-1}$, $I'^t$ and $I^{t+1}$ are taken as one group of inputs, and $I^{t-1}$, $I_{in3}{}^t$ and $I^{t+1}$ are taken as another group of inputs. The two groups of inputs are spliced to obtain third spliced images. Then, the third spliced images are inputted into a network 3, and the network 3 outputs an image $I_{out3}{}^t$, i.e., a final result $I'_{out}{}^t$ of the entire network.

In a possible embodiment of the present disclosure, $I_{out2}{}^t$ from the network 3 is 2-times upsampled through bicubic interpolation. It should be noted that, the upsampling may also be performed using any other method.

Figure 11:
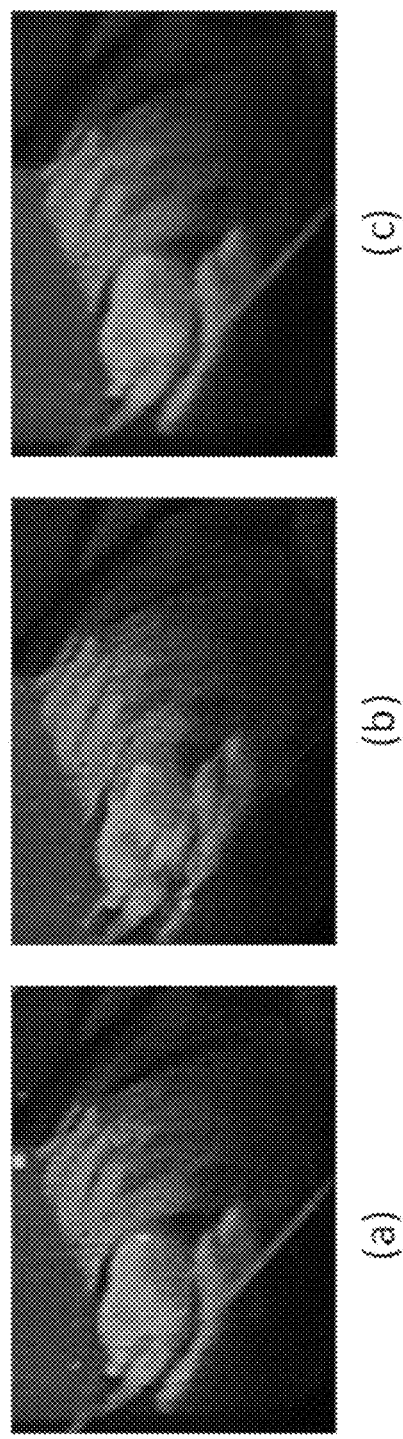
FIG. 11 is a schematic view showing comparison between the to-be-processed video frame and an output image of the multiscale cascade network according to an embodiment of the present disclosure.

As shown in FIG. 11, FIG. 11(a) shows a part of the original to-be-processed video frame, FIG. 11(b) shows a part of the dead-point-repaired image obtained after filtration, the dead-point-repaired image includes the movement artifact caused by filtration, and FIG. 11(c) shows a part of the repaired imaged outputted by the multiscale cascade network. It can be seen that, the movement artifact has been eliminated.

In a possible embodiment of the present disclosure, each of the network 1, the network 2 and the network 3 is an encoder-decoder resblock network structure proposed in SRN. In order to improve an effect of the network, in the embodiments of the present disclosure, the three sub-networks do not share parameters.

In a possible embodiment of the present disclosure, each sub-network includes a plurality of three-dimensional (3D) convolutional layers, a plurality of deconvolutional layers, and a plurality of 3D average pooling layers.

Figure 12:
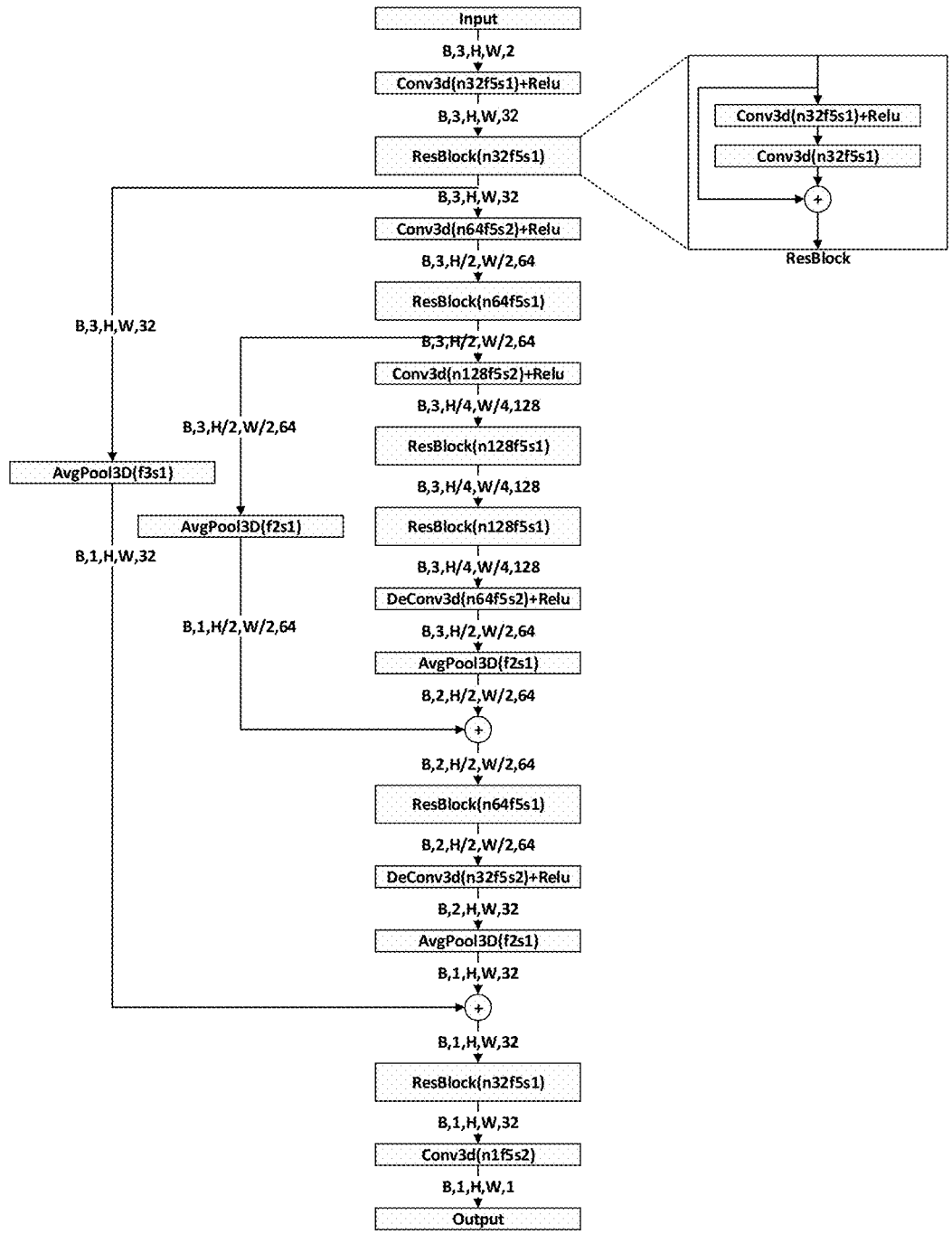
FIG. 12 is a schematic view showing a sub-network according to an embodiment of the present disclosure.

As shown in FIG. 12 which shows a sub-network, the sub-network is an encoder-decoder resblock network, where Conv3d(n32f5s1) represents a 3D convolutional layer in which the quantity (n) of filters is 32, a size (f) of each filter is (1×5×5) and a filtration step (s) is 1, DeConv3d(n32f5s2) represents a 3D deconvolutional layer in which the quantity (n) of filters is 32, a size (f) of each filter is (1×5×5) and a filtration step (s) is 2, AvgPool3D(f2s1) represents a 3D average pooling layer in which a kernel size (f) is (2×1×1) and a step (s) is 1, and (B,3,H,W,32) on each arrow represents a size of a feature map outputted by a current layer. Here, (B,3,H,W,32) refers to a size of an intermediate result outputted by each layer of the network. Each layer of the network outputs a 5-dimensional array, and (B,3,H,W,32) refers to a structure of array, i.e., B×3×H×W×32, where B represents Batch_size.

As shown in FIG. 12, the sub-network totally includes 16 3D convolutional layers and 2 3D deconvolutional layers, and information of adjacent frames is fused through the 3D average pooling layer. Each of output feature maps from a third convolutional layer and a first deconvolutional layer is subjected to information fusion through a corresponding 3D average pooling layer, then summation is performed pixel by pixel, and then a result is taken as an input of a fourteenth convolutional layer. Each of output feature maps from a sixth convolutional layer and a second deconvolutional layer is subjected to information fusion through a corresponding 3D average pooling layer, then summation is performed pixel by pixel, and then a result is taken as an input of a twelfth convolutional layer. Finally, the image where the artifact has been removed is outputted through a convolutional layer in which the quantity of filters is 1.

In a possible embodiment of the present disclosure, the multiscale cascade network is obtained through: Step 1 of obtaining consecutive $N_1$ training images, the $N_1$ training images including a to-be-processed training image, at least one training image before the to-be-processed training image, and at least one training image after the to-be-processed training image; Step 2 of performing filtration on the to-be-processed training image in accordance with the $N_1$ training images to obtain a first training image; and Step 3 of training a to-be-training multiscale cascade network in accordance with the first training image, the at least one training image before the to-be-processed training image and the at least one training image after the to-be-processed training image, so as to obtain the trained multiscale cascade network.

In a possible embodiment of the present disclosure, when training the to-be-trained multiscale cascade network, a total loss includes at least one of an image content loss, a color loss, an edge loss and a perceptual loss.

The image content loss is mainly used to increase fidelity of the output image. In a possible embodiment of the present disclosure, the image content loss is calculated using an L1 loss function or a mean square error loss function.

In a possible embodiment of the present disclosure, the $L_1$ loss is calculated through:

$$l_{content} = \frac{1}{n}\sum_{i=1}^{n}|y_i - \hat{y}_i|$$

where $I_{content}$ represents the $L_1$ loss, $\hat{y}_i$ represents an artifact-removed training image, $y_i$ represents the first training image, and n represents the quantity of images in one batch.

The color loss function is used to correct an image color through performing Gaussian blur treatment on textures and contents of the artifact-removed training image and a target image and merely reserving color information about the images. In a possible embodiment of the present disclosure, the color loss is calculated through:

$$l_{color} = \frac{1}{n}\sum_{i=1}^{n}\|\text{Blur}(y_i) - \text{Blur}(\hat{y}_i)\|^2$$

where $I_{color}$ represents the color loss, $\hat{y}_i$ represents the artifact-removed training image, $y_i$ represents the first training image, n represents the quantity of images in one batch, and Blur(x) represents a Gaussian blur function.

The edge loss function is mainly used to increase accuracy of profile information about the artifact-removed training image through calculating a difference between edge information about the artifact-removed training image and edge information about the target image. In the embodiments of the present disclosure, the edge information about the image is extracted through a Holistically-Nested Network (HED). In a possible embodiment of the present disclosure, the edge loss is calculated through:

$$l_{edge} = \frac{1}{n}\sum_{i=1}^{n}\|H_j(y_i) - H_j(\hat{y}_i)\|^2$$

where $I_{edge}$ represents the edge loss, $\hat{y}_i$ represents the artifact-removed training image, $y_i$ represents the first training image, n represents the quantity of images in one batch, and $H_j(x)$ represents an image edge map extracted by a $j^{th}$ layer of the HED.

In the embodiments of the present disclosure, a perceptual loss function is calculated using a high-layer feature extracted by a VGG network, so as to measure a difference between the output image and the target image at a semantic level. In a possible embodiment of the present disclosure, the perceptual loss is calculated through:

$$l_{feature} = \frac{1}{n}\sum_{i=1}^{n}\|\varphi_j(y_i) - \varphi_j(\hat{y}_i)\|^2$$

where $I_{feature}$ represents the perceptual loss, $\hat{y}_i$ represents the artifact-removed training image, $y_i$ represents the first training image, n represents the quantity of images in one batch, and $\varphi_j(x)$ represents an image feature map extracted by the $j^{th}$ layer of the HED.

In a possible embodiment of the present disclosure, the total loss is weighted sum of the image content loss, the color loss, the edge loss and the perceptual loss.

In a possible embodiment of the present disclosure, the total loss is calculated through:

$$L = l_{content} + \lambda_1 l_{color} + \lambda_2 l_{edge} + \lambda_3 l_{feature},$$

where $\lambda_1=0.5$, $\lambda_2=10^{-2}$, and $\lambda_3=10^{-4}$. It should be noted that, in some other embodiments of the present disclosure, a weight of each loss is not limited thereto.

In the embodiments of the present disclosure, training data provided by video time-domain super-resolution track in 2020-AIM is used. The training set totally includes 240 groups of frame sequences, and each group includes 181 1280×720 images. The training data set is used for the following reasons.

a) The 181 images in each group are taken in a same scenario, and when the images in a same scenario is used for the training, it is able to prevent the occurrence of interference due to a too large difference in the image contents in different scenarios.

b) The training data set is used for training in the video time-domain super-resolution track, and there is appropriate movement for an object in the image in a same scenario between adjacent frames, so it is able to meet the requirement on artifacts when simulating the training data.

c) Each image in the training data set is relatively clean, does not include any noise, and has a relatively large resolution, so it is able to facilitate the generation of a clearer image through the network.

Before the to-be-processed video frame has been inputted into the multiscale cascade network, the dead point has been repaired, and a main object of the training is to remove the artifact generated due to the filtration. Hence, when generating simulation data, a same filtration operation is merely performed on the training data set, and it is unnecessary to simulate the generation of the dead point.

In the embodiments of the present disclosure, a network model is trained in an ubuntu 16.04 system, and compiled using python, on the basis of a deep learning framework tensorflow as well as open-source image/video processing tools such as opencv and ffmpeg.

In a possible embodiment of the present disclosure, the training the to-be-trained multiscale cascade network in accordance with the first training image, the at least one training image before the to-be-processed training image and the at least one training image after the to-be-processed training image includes: randomly cutting out an image block from the first training image, and cutting out an image block from each of the at least one training image before the to-be-processed training image and the at least one training image after the to-be-processed training image at a same position, so as to obtain $N_1$ image blocks; and inputting the $N_1$ image blocks into the to-be-trained multiscale cascade network for training.

In the embodiments of the present disclosure, a network parameter is optimized through an Adam optimization algorithm. A learning rate of the Adam algorithm is set as 10-4, and during the training, consecutive three training images are selected from the training data set for preprocessing, i.e. median filtration. Next, an image block having a size of 512×512 is randomly cut out from an intermediate image, and an image block is cut out from each of the images before and after the intermediate image as an input for each iteration in the network. After all the images in the training data set has been read, one epoch of iteration is completed. When ten epochs of iteration (one epoch is a procedure where all training samples have been trained once) have been completed, the learning rate of the Adam algorithm is reduced to 9/10 of the original learning rate.

In the embodiments of the present disclosure, the cut image block is downsampled, so as to enlarge the data set. In other words, a plurality of image blocks is cut out from a same image randomly for training the network, so as to increase the quantity of images for the training. Through the random cutting, it is able to select the image blocks from a same image at different positions. In addition, when the image is cut into image blocks, it is also able to reduce the resolution of the image, thereby to reduce the data amount to be processed by the network and improve a processing speed.

(3) Postprocessing

In the embodiments of the present disclosure, in the image subjected to the dead point removal and the artifact removal, the dead point and the artifact caused by the movement of an object in the image are removed. However, there is still a difference between the overall definition of the image outputted by the network and the original to-be-processed video frame. Hence, the to-be-processed video frame, the dead-point-repaired image and the image repaired by the multiscale cascade network are filtered, so as to add details in the original to-be-processed video frame into the repaired image, thereby to increase the definition of the repaired image.

Hence, in a possible embodiment of the present disclosure, subsequent to obtaining the artifact-repaired image, the image processing method further includes filtering the artifact-repaired image in accordance with the to-be-processed video frame and the dead-point-repaired image to obtain the output image.

Further, in a possible embodiment of the present disclosure, the artifact-repaired image is subjected to median filtration in accordance with the to-be-processed video frame and the dead-point-repaired image, so as to obtain the output image.

Figure 13:
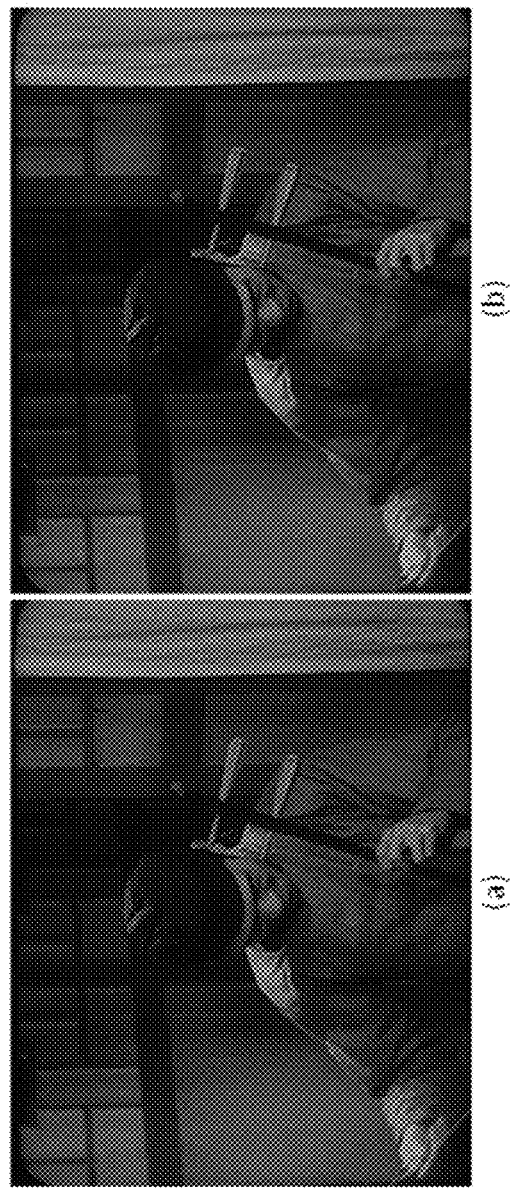
FIG. 13 is a schematic view showing comparison between the output image of the multiscale cascade network and a postprocessed image according to an embodiment of the present disclosure.

FIG. 13(a) shows the output image of the multiscale cascade network, and FIG. 13(b) shows a postprocessed image. As shown in FIG. 13, the definition of the postprocessed image is obviously higher than the definition of the output image from the multiscale cascade network.

3. Denoising

As shown in FIG. 14, the denoising step includes Step 141 of denoising the to-be-processed video frame through a denoising network, the denoising network being obtained through obtaining a target non-movement mask in accordance with consecutive $N_2$ video frames including a to-be-denoised video frame, and training a to-be-trained denoising network in accordance with the $N_2$ video frames and the target non-movement mask to obtain the denoising network.

In the embodiments of the present disclosure, the denoising network is trained using a blind denoising technology, i.e., it is unnecessary to provide the training data sets in pairs, and instead, it is merely necessary to input to-be-denoised video frame sequences. Through the non-movement mask, merely non-movement data is denoised in a time domain, so this technology is suitable for training the denoising network where no clear reference image is provided. Meanwhile, this technology is suitable for removing various video noises, without taking a noise type into consideration, i.e., it is merely necessary to train the denoising network through a part of video frames.

In a possible embodiment of the present disclosure, the training the to-be-trained denoising network in accordance with the $N_2$ video frames and the target non-movement mask to obtain the denoising network include: Step 151 of obtaining a reference image in accordance with the $N_2$ video frames and the target non-movement mask (the reference image is equivalent to truth values of the to-be-denoised video frame, i.e., an image without any noise); Step 152 of inputting the to-be-denoised video frame into the to-be-trained denoising network to obtain a first denoised image; Step 153 of obtaining a second denoised image in accordance with the first denoised image and the target non-movement mask; and Step 154 of determining a loss function of the to-be-trained denoising network in accordance with the reference image and the second denoised image, and adjusting a parameter of the to-be-trained denoising network in accordance with the loss function to obtain the denoising network.

In the embodiments of the present disclosure, the non-movement mask of the video frame is obtained through an optical flow method, which will be described hereinafter in details.

Optical flow refers to an instantaneous speed of a pixel of an object moving in a space on an imaging plane. The optical flow method is a method for determining a correspondence between a current frame and a previous frame in accordance with a change in a pixel of an image sequence in a time domain and correlation between adjacent frames, and calculating movement information about the object in the adjacent frames.

Prior to obtaining the non-movement mask, at first a movement mask needs to be obtained. The movement mask refers to movement information in the image, and the non-movement mask refers to information in the image other than the movement mask, i.e., non-movement information.

As shown in FIG. 15 which shows a procedure of obtaining the movement mask through an optical flow network, two video frames F and Fr are inputted into the optical flow network to obtain an optical flow image, and then the movement mask is obtained through the optical flow image.

In the embodiments of the present disclosure, the optical flow network will not be particularly defined herein, and any known open-source optical flow network, e.g., flownet or flownet2, or a traditional optical flow algorithm (not deep learning algorithm), e.g., TV-L1 flow, may be selected, as long as the optical flow image is obtained through an optical flow algorithm.

Figure 16:
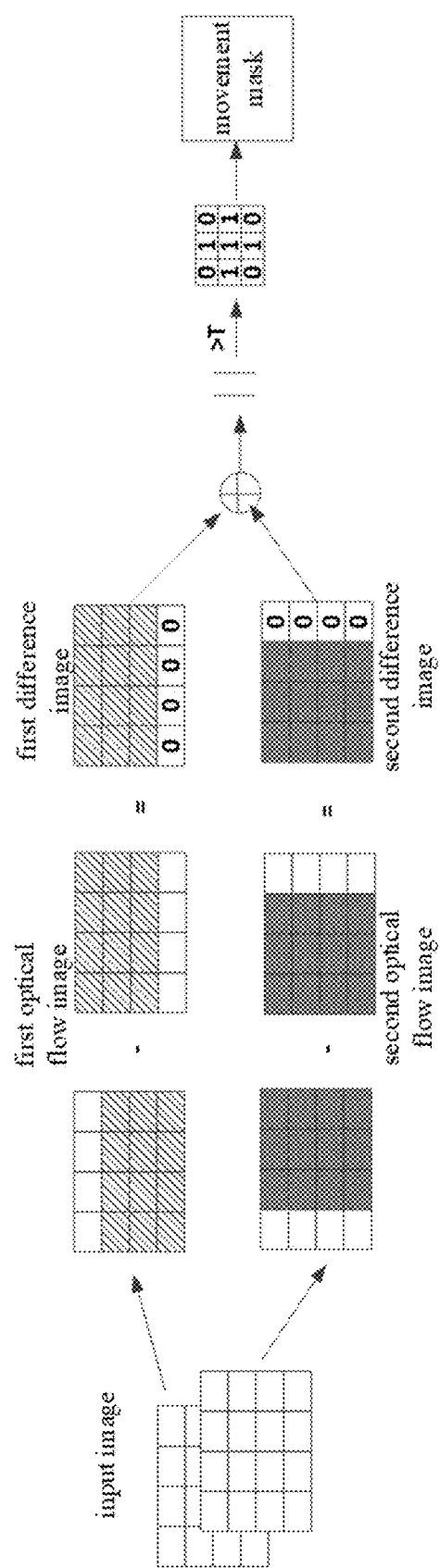
FIG. 16 is a schematic view showing a specific process of obtaining the movement mask through the optical flow network according to an embodiment of the present disclosure.

As shown in FIG. 16 which shows a specific procedure of obtaining the movement mask through the optical flow network, two images inputted into the optical flow network each have a size of (720, 576) and the optical flow network outputs two optical flow images. At this time, each optical flow image has a size of (720, 576). The two optical flow images include a first optical flow image representing up-and-down movement information in consecutive two images and a second optical flow image representing left-and-right movement information in the consecutive two images. A subtraction operation is performed on last X-X1 rows and first X-X1 rows in the first optical flow image (in FIG. 16, first three rows are subtracted from last three rows) to obtain a first difference image. A subtraction operation is performed on last Y-Y1 columns and first Y-Y1 columns in the second optical flow image (in FIG. 16, first three columns are subtracted from last three columns) to obtain a second difference image. Last X1 rows in the first difference image are subjected to zero padding, and last Y1 columns in the second difference image are subjected to zero padding, so as to obtain an image having a same size as the optical flow image. Then, the two difference images are added, where ∥ represents an absolute value, >T represents a pixel whose numerical value at a corresponding pixel position is greater than T after the absolute value has been calculated, whose value is assigned to one, and a value smaller than or equal to T is assigned to zero, and T is a predetermined threshold. A binary image is obtained after thresholding. In a possible embodiment of the present disclosure, the binary image is also subjected to dilation operation. To be specific, pixels whose value is 1 are found in the binary image, and pixel positions in the binary image corresponding to positions in a dilation kernel whose value is 1 are set as 1. FIG. 16 shows an instance of a 3*3 dilation kernel, i.e., when the numerical value at a pixel position in a certain row and a certain column in the binary image is 1, the pixel positions above, below, to the left and to the right of the pixel position are all set as 1. In addition, any other dilation kernel may be adopted, as long as a dilation effect may be achieved. Here, the dilation operation is used to enlarge a range of the movement mask, so as to mark out all movement positions as possible, thereby to reduce an error.

Through the above procedure, it is able to obtain the movement mask Mask_move in the video frame, and each value of the mask is binary, i.e., 0 or 1. A position where the value is 1 represents that there is movement, and a position where the value is 0 represents that there is no movement. The non-movement mask is calculated through Mask_static=1−Mask_move.

A training procedure of the denoising network will be described hereinafter in conjunction with a method for determining the target non-movement mask.

In a possible embodiment of the present disclosure, the method for determining the target non-movement mask includes the following steps.

Step 181: grouping each first video frame in the $N_2$ video frames and the to-be-denoised video frame into a sample pair, and inputting the sample pair to the optical flow network to obtain a first optical flow image representing up-and-down movement information and a second optical flow image representing left-and-right movement information, the first video frame being a video frame in the $N_2$ video frames other than the to-be-denoised video frame, the first optical flow image and the second optical flow image each having a resolution of X*Y.

Step 182: calculating the movement mask in each first video frame and the to-be-denoised video frame in accordance with the first optical flow image and the second optical flow image, so as to obtain $N_2-1$ movement masks.

Presumed that the $N_2$ video frames include F1, F2, F3, F4 and F5, and F3 is the current to-be-denoised video frame, F1 and F3 may be grouped into a sample pair and inputted into the optical flow network to obtain a movement mask Mask_move1, F2 and F3 may be grouped into a sample pair and inputted into the optical flow network to obtain a movement mask Mask_move2, F4 and F3 may be grouped into a sample pair and inputted into the optical flow network to obtain a movement mask Mask_move4, and F5 and F3 may be grouped into a sample pair and inputted into the optical flow network to obtain a movement mask Mask_move5.

Step 183: obtaining the target non-movement mask in accordance with the $N_2-1$ movement masks.

In a possible embodiment of the present disclosure the obtaining the target non-movement mask in accordance with the $N_2-1$ movement masks includes: obtaining $N_2-1$ non-movement masks in accordance with the $N_2-1$ movement masks, the non-movement mask=1−the movement mask; and multiplying the $N_2-1$ non-movement masks to obtain the target non-movement masks.

In a possible embodiment of the present disclosure, the calculating the movement mask in each first video frame and the to-be-denoised video frame in accordance with the first optical flow image and the second optical flow image includes the following steps.

Step 191: performing subtraction operation on last X-X1 rows and first X-X1 rows in the first optical map to obtain a first difference image, and subjecting last X1 rows in the first difference image to zero padding to obtain a processed first difference image.

X1 is a positive integer smaller than X. For example, X1 is 1, i.e., the subtraction operation is performed on last X−1 rows and first X−1 rows to obtain the first difference image.

Step 192: performing subtraction operation on last Y-Y1 columns and first Y-Y1 columns in the second optical flow image to obtain a second difference image, and subjecting last Y1 columns in the second difference image to zero padding to obtain a processed second difference image.

Y1 is a positive integer smaller than Y. For example, Y1 is 1, i.e., the subtraction operation is performed on last Y−1 columns and first Y−1 columns to obtain the second difference image.

Step 193: adding the processed first difference image with the processed second difference image to obtain a third difference image.

Step 194: assigning a pixel in the third difference image whose absolute value is greater than a predetermined threshold as 1, and assigning a pixel in the third difference image whose absolute value is smaller than the predetermined threshold as 0, so as to obtain a binary image.

Step 195: obtaining the movement mask in accordance with the binary image.

In a possible embodiment of the present disclosure, the obtaining the movement mask in accordance with the binary image includes performing dilation operation on the binary image to obtain the movement mask.

In a possible embodiment of the present disclosure, the obtaining the reference image in accordance with the $N_2$ video frames and the target non-movement mask includes: multiplying each of the $N_2$ video frames by the target non-movement mask to obtain $N_2$ products; and summating the $N_2$ products to obtain a resultant sum, and averaging the resultant sum to obtain the reference image.

In a possible embodiment of the present disclosure, the $N_2$ products are subjected to weighted summation and then a resultant sum is averaged to obtain the reference image. A weight may be set according to the practical need.

In a possible embodiment of the present disclosure, the obtaining the second denoised image in accordance with the first denoised image and the target non-movement mask includes multiplying the first denoised image by the target non-movement mask to obtain the second denoised image.

In a possible embodiment of the present disclosure, $N_2$ is 5 to 9.

The training method of the denoising network will be described hereinafter when $N_2$ is 5.

Figure 17:
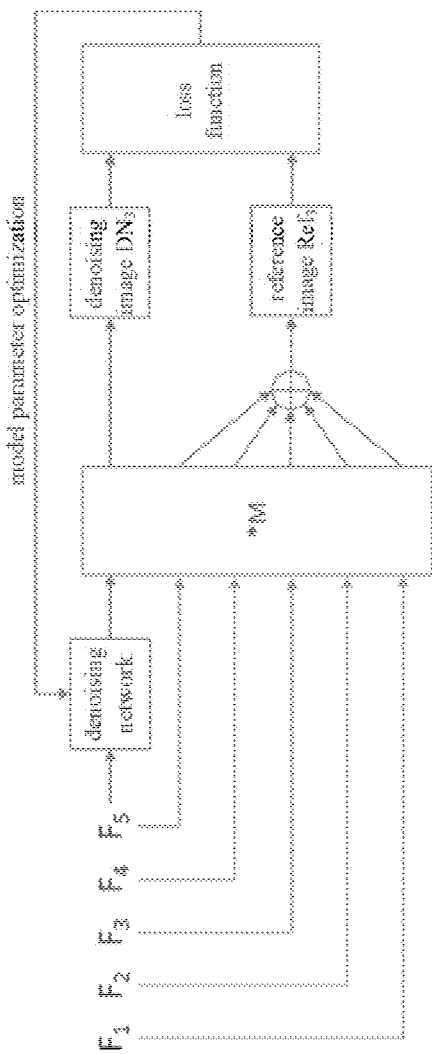
FIG. 17 is a schematic view showing a training method of a denoising network according to an embodiment of the present disclosure.

As shown in FIGS. 17, F1, F2, F3, F4 and F5 are consecutive five video frames, F3 is a current to-be-denoised video frame, DN3 is a denoised image outputted by the denoising network and corresponding to F3, M is the target non-movement mask, * represents a multiplication operation at a corresponding pixel position, and Ref3 represents the reference image and it may be considered as a truth value corresponding to DN3.

At first, as shown in FIG. 16, F1 and F3 are inputted into the optical flow network to obtain the movement mask Mask_move1, F2 and F3 are inputted into the optical flow network to obtain the movement mask Mask_move2, F4 and F3 are inputted into the optical flow network to obtain the movement mask Mask_move4, and F5 and F3 are inputted into the optical flow network to obtain the movement mask Mask_move5, so as to calculate non-movement masks Mask_static1, Mask_static2, Mask_static4 and Mask_static5. A resultant M is a product of the four non-movement masks, i.e., the non-movement part in all the non-movement masks is reserved and the movement part is removed.

The reference image is obtained as follows. Each of F1, F2, F3, F4 and F5 is multiplied by M, resultant products are summated, and then a resultant sum is averaged. This is a principle of denoising in a time domain. Based on the principle that valid information in consecutive frames is distributed in a same manner but noises are distributed randomly and irregularly, the multiple frames are summated and then an average is obtained, so as to reserve the valid information and cancel out the random noises. The calculation of the non-movement masks is to ensure that the valid information about the pixels in the denoised image and the reference image at a corresponding position is the same. When the multiple frames are directly summated and the average is obtained without any step of calculating the non-movement masks, the valid information at a non-movement position may be reserved, but a serious artifact may occur at a movement position. At this time, the original valid information may be destroyed, and it is impossible to take the image as the reference image for training. Through the reference image, the non-movement position is reserved in the generated reference image, and a pixel at a corresponding position is reserved in the denoised image, so as to form a training data pair for the training.

The denoised image is obtained as follows. F3, or together with its adjacent video frames, are inputted into the denoising network to obtain a first denoised image, and then the first denoised image is multiplied by M to obtain a second denoised image (i.e., DN3).

Figure 18:
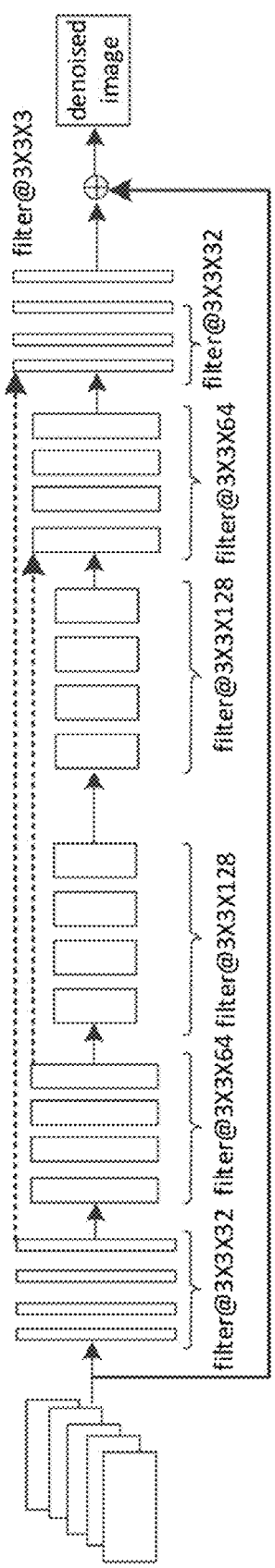
FIG. 18 is a schematic view showing an implementation method of the denoising network according to an embodiment of the present disclosure.

In the embodiments of the present disclosure, the denoising network may be any denoising network. As shown in FIG. 18 which shows an implementation method of a denoising network, an input of the denoising network is five consecutive video frames. The denoising network includes a plurality of filters connected in series, and each filter includes a plurality of convolutional kernels connected in series (vertical bars in FIG. 18). In FIG. 18, each filter includes four convolutional kernels connected in series. It should be noted that, in some other embodiments of the present disclosure, the quantity of convolutional kernels in each filter is not limited to four. In the embodiments of the present disclosure, in the plurality of filters connected in series, every two filters have a same resolution, and apart from a last filter, an output of each filter serves as an input of a next filter and a filter having a same resolution. In FIG. 18, the denoising network includes six filters connected in series, a first filter and a sixth filter have a same resolution, a second filter and a fifth filter have a same resolution, and a third filter and a fourth filter have a same resolution. An output of the first filter serves as inputs of the second filter and the sixth filter (having a same resolution as the first filter), an output of the second filter serves as inputs of the third filter and the fifth filter (having a same resolution as the second filter), and an output of the third filter serves as an input of the fourth filter (having a same resolution as the third filter).

In the embodiments of the present disclosure, after the denoising network has been trained, a stored parameter may be taken as an initialization parameter for denoising a video frame next time. In this way, it is merely necessary to complete a new training operation through about 100 new video frames.

Figure 19:
FIG. 19 is a schematic view showing the to-be-processed video frame according to an embodiment of the present disclosure.
Figure 20:
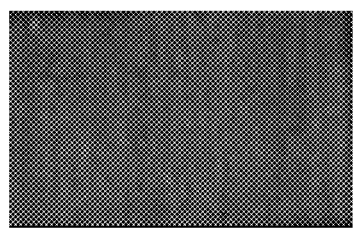
FIG. 20 is an enlarged view showing a part of the to-be-processed video frame in FIG. 19.
Figure 21:
FIG. 21 is a schematic view showing a target non-movement mask M corresponding to the to-be-processed video frame in FIG. 19.
Figure 22:
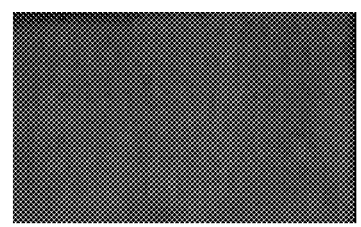
FIG. 22 is a schematic view showing an image obtained after denoising the to-be-processed video frame through the denoising network according to an embodiment of the present disclosure.

As shown in FIGS. 19 to 22, FIG. 19 shows the to-be-processed video frame, FIG. 20 shows an enlarged view of a part of the to-be-processed video frame in FIG. 19, FIG. 21 shows the target non-movement mask M corresponding to the to-be-processed video frame in FIG. 19, and FIG. 22 shows an image after denoising the to-be-processed video frame through the denoising network. It can be seen that, the denoising effect is obvious.

4. Color Cast Correction

A colorful digital image collected by a digital imaging device such as digital camera is obtained through combining red (R), green (G) and blue (B) channels. However, during the imaging, usually an image taken by the digital imaging device has a certain color difference from an original scenery due to illumination and a photosensitive element, and this is called as color cast. Generally, for an image where there is the color cast, an average pixel value of one or more of the R, G and B channels is obviously high. A visual effect of the image is adversely affected by color distortion due to the color cast, so it is very important to correct the color cast when processing the digital image. When processing an old photo or old image, usually it is necessary to correct the color cast due to long-term use and preservation issues.

Figure 23:
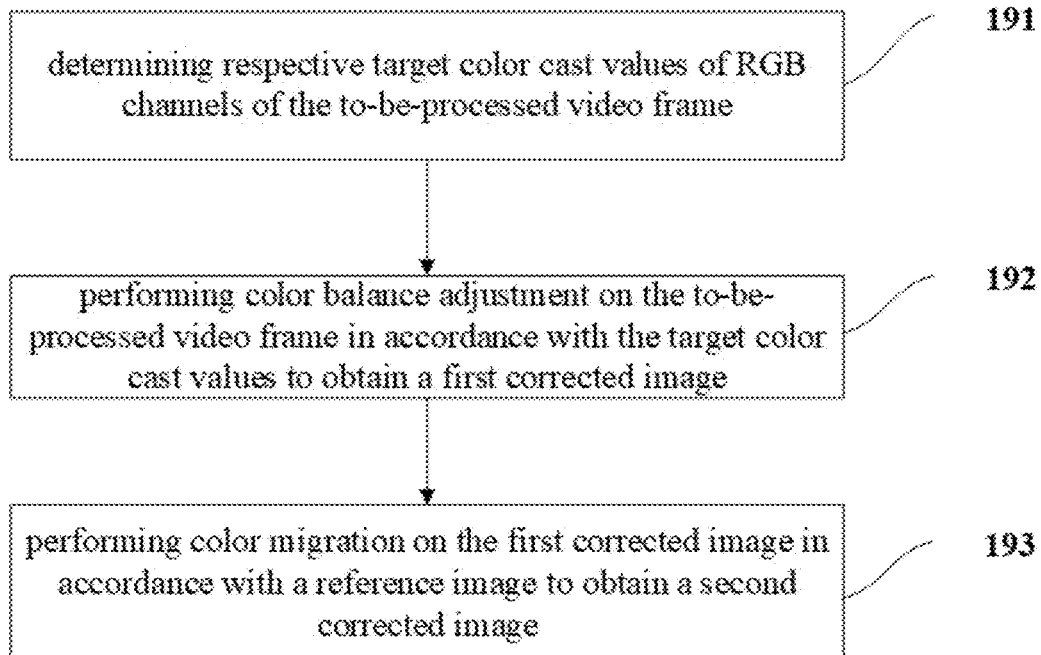
FIG. 23 is a flow chart of a color cast correcting step according to an embodiment of the present disclosure.

In order to correct the color cast in the video frame, as shown in FIG. 23, the color cast correcting step includes: Step 191 of determining respective target color cast values of RGB channels of the to-be-processed video frame; Step 192 of performing color balance adjustment on the to-be-processed video frame in accordance with the target color cast values to obtain a first corrected image; and Step 193 of performing color migration on the first corrected image in accordance with a reference image to obtain a second corrected image. The reference image is an inputted image substantially having no color cast.

In the embodiments of the present disclosure, at first an image color cast degree is estimated automatically, and the to-be-processed video frame is subjected to color balance adjustment to correct the color cast preliminarily. Next, the image obtained after the color balance adjustment is subjected to color migration in accordance with the reference image, so as to further correct the color cast, thereby to enable a color cast correction result to meet an expectation in a better manner.

In a possible embodiment of the present disclosure, the determining the target color cast values of the RGB channels of the to-be-processed video frame includes the following steps.

Step 201: obtaining averages of the RGB channels of the to-be-processed video frame.

The averages (avgR, avgG and avgB) of the RGH channels are calculated as follows. Grayscale values of all R subpixels in the to-be-processed video frame are summated, and then an average is calculated to obtain avgR. Grayscale values of all G subpixels in the to-be-processed video frame are summated, and then an average is calculated to obtain avgG. Grayscale values of all B subpixels in the to-be-processed video frame are summated, and then an average is calculated to obtain avgB.

Step 202: converting the averages of the RGB channels to a Lab color space to obtain color components (l, a, b) in the Lab space corresponding to the averages of the RGB channels respectively.

Lab is a device-independent color system and also a physiological feature-based color system. It means that, it is used to describe a human being's visual sense through digitalization. In the Lab color space, the component L is used to represent luminance of a pixel, with a range of [0,100], i.e., from absolute black to absolute white; the component a represents a range from red to green, with a range of [127,−128]; and the component b represents a range from yellow to blue, with a range of [127,−128].

Generally, for a normal image without any color cast, values of a and b should approximate to 0. When a>0, the image is reddish, otherwise the image is greenish. When b>0, the image is yellowish, otherwise the image is bluish.

Step 203: determining color cast degrees (1, 0-a, 0-b) corresponding to averages of the RGB channels in accordance with the color components (1, a, b) in the Lab space.

Depending on a gray world hypothesis, for an image without any color cast, the color components a and b corresponding to the averages should approximate to 0, so the color cast degrees corresponding to the averages of the RGB channels are (1, 0-a, 0-b).

Step 204: converting the color cast degrees (1, 0-a, 0-b) to an RGB color space, to obtain target color cast values of the RGB channels.

It is impossible to directly convert the RGB color space into the Lab color space. In the embodiments of the present disclosure, it is necessary to convert the RGB color space into an XYZ color space, and then convert the XYZ color space into the Lab color space.

In other words, the converting the averages of the RGB channels into the Lab color space includes converting the averages of the RGB channels into the XYZ color space to obtain averages in the XYZ color space, and converting the averages in the XYZ color space into the Lab color space.

Identically, the converting the color cast degrees (1, 0-a, 0-b) into the RGB color space includes covering the color cast degrees into the XYZ color space to obtain color cast degrees in the XYZ color space, and converting the color cast degrees in the XYZ color space into the RGB color space.

In the embodiments of the present disclosure, a conversion relationship between RGB and XYZ is expressed as:

$$\begin{bmatrix} X \\ Y \\ Z \end{bmatrix} = \begin{bmatrix} 0.412453 & 0.357580 & 0.180423 \\ 0.212671 & 0.715160 & 0.072169 \\ 0.019334 & 0.119193 & 0.950227 \end{bmatrix} \begin{bmatrix} R \\ G \\ B \end{bmatrix}$$

$$\begin{bmatrix} R \\ G \\ B \end{bmatrix} = \begin{bmatrix} 3.240479 & -1.537150 & -0.498535 \\ -0.969256 & 1.875992 & 0.041556 \\ 0.055648 & -0.204043 & 1.057311 \end{bmatrix} \begin{bmatrix} X \\ Y \\ Z \end{bmatrix}.$$

A conversion relationship between XYZ and Lab is expressed as:

$$L = 116 f\left(\frac{Y}{Y_n}\right) - 16$$

$$A = 500\left[f\left(\frac{X}{X_n}\right) - f\left(\frac{Y}{Y_n}\right)\right]$$

$$b = 200\left[f\left(\frac{Y}{Y_n}\right) - f\left(\frac{Z}{Z_n}\right)\right]$$

$$f(t) = \begin{cases} t^{1/3} & \text{if } t > \left(\frac{29}{6}\right)^3 \\ \frac{1}{3}\left(\frac{29}{6}\right)^2 t + \frac{4}{29} & \text{otherwise} \end{cases},$$

where $X_n$, $Y_n$ and $Z_n$ are 0.95047, 1.0 and 1.08883 respectively by default.

A method for performing the color balance adjustment will be described hereinafter.

For a concept "white balance", a region is defined as a standard and this region is considered to be white (a gray-scale value of 18), and a color of the other region is obtained through offsetting on the basis of this standard. A principle of the color balance adjustment includes increasing or decreasing a contrast color so as to eliminate the color cast of the image.

In a possible embodiment of the present disclosure, the performing color balance adjustment on the to-be-processed video frame in accordance with the target color cast value to obtain the first corrected image includes performing the color balance adjustment on the to-be-processed video frame through at least one of a highlight function, a shadow function and a midtone function in accordance with the target color cast value of each of the RGB channels. The highlight function and the shadow function are linear functions, and the midtone function is an exponential function.

In a possible embodiment of the present disclosure, the highlight function is y=a(v)*x+b(v), the shadow function is y=c(v)*x+d(v), and the midtone function is y=x^{f(v)}, where y represents the first corrected image, x represents the to-be-processed video frame, v is determined in accordance with the target deviation value of each of the RGB channels, and f(v), a(v), b(v), c(v) and d(v) are functions of v.

In the embodiments of the present disclosure, during the midtone adjustment, when any parameter is modified separately, a current channel may change toward a direction, and the other two channels may change toward another direction. For example, a parameter of the R channel is increased by 50, a pixel value of the R channel may increase, and pixel values of the G and B channels may decrease (G−50, B−50) in a direction completely opposite to the R channel.

During the highlight adjustment, for forward adjustment, e.g., when a parameter of the R channel is increased by 50, an effect of the algorithm lies in that merely a value of the R channel is increased and values of the other two channels remain unchanged. For backward adjustment, e.g., when a parameter of the R channel is decreased by 50, the effect of the algorithm lies in that the value of the R channel remains unchanged and the values of the other two channels are increased.

During the shadow adjustment, for forward adjustment, e.g., when the value of the R channel is increased by 50, the effect of the algorithm lies in that the value of the R channel remains unchanged and the values of the other two channels are decreased. For backward adjustment, e.g., when the value of the R channel is decreased by 50, the effect of the algorithm lies in that the value of the R channel is decreased and the values of the other two channels remain unchanged.

In a possible embodiment of the present disclosure, $f(v) = e^{-v}$.

In a possible embodiment of the present disclosure, $$a(v) = \frac{1}{1-v}, \text{ and } b(v) = 0.$$

In a possible embodiment of the present disclosure, $$c(v) = \frac{1}{1-v}, \text{ and } d(v) = \frac{-v}{1-v}.$$

When the three colors RGB are mixed at an equal amount, gray with different brilliances is obtained. When ΔR, ΔGd and ΔB are changed by a same value, theoretically an original image does not change (when a value of gray is increased or decreased, the color shall not change, and the brilliance needs to be maintained, i.e., the brilliance shall not change either). For example, an effect caused when ΔR, ΔGd and ΔB are (+20, +35, +15) is equivalent to an effect caused when ΔR, ΔGd and ΔB are (+5, +20, 0), and equivalent to an effect caused when ΔR, ΔGd and ΔB are (0, +15, −5). Hence, in order to reduce a total change amount, (ΔR−d, ΔG−d, ΔB−d) which meets a condition $$\min_d |\Delta R - d| + |\Delta G - d| + |\Delta B - d|$$

is taken as the final target color cast value. Three target color cast values are combined to obtain v.

In a possible embodiment of the present disclosure, for the R channel, v=(ΔR−d)−(ΔG−d)−(ΔB−d); for the G channel, v=(ΔG−d)−(ΔR−d)−(ΔB−d); and for the B channel, v=(ΔB−d)−(ΔR−d)−(ΔG−d), where ΔR, ΔG and ΔB are the target color cast values of the RGB channels respectively, and d is a median obtained after ranking ΔR, ΔG and ΔB in accordance a size of the value. For example, when ΔR is 10, ΔG is 15 and ΔB is 5, d=10.

A method for color migration will be described hereinafter.

In a possible embodiment of the present disclosure, the performing color migration on the first corrected image in accordance with the reference image to obtain the second corrected image includes the following steps.

Step 211: converting the reference image and the first corrected image into the Lab color space. A conversion method may refer to the above-mentioned method for converting RGB to Lab.

Step 212: determining averages and standard deviations of the reference image and the first corrected image in the Lab color space.

Step 213: determining a color migration result of a $k^{th}$ channel in the Lab color space in accordance with the averages and the standard deviations of reference image and the first corrected image.

Step 214: converting the color migration result to the RGB color space to obtain the second corrected image.

In a possible embodiment of the present disclosure, the color migration result is calculated through $$I_k = \frac{\sigma_t^k}{\sigma_s^k}(S_k - \mu_s^k) + \mu_t^k,$$

where $I_k$ represents the color migration result of the $k^{th}$ channel in the Lab color space, t represents the reference image, S represents the first corrected image, $\mu_s^k$ represents an average of the $k^{th}$ channel of the first corrected image, $\sigma_s^k$ represents the standard deviation of the $k^{th}$ channel of the first corrected image, $\mu_t^k$ represents the average of the $k^{th}$ channel of the reference image, and $\sigma_t^k$ represents the standard deviation of the $k^{th}$ channel of the reference image.

Experiments show that, during the color migration, the migration of a luminance channel may lead to a change in the brightness of the image. Especially for an image including a large region in a same color, a change in the luminance channel may lead to a visual change. Hence, in the embodiments of the present disclosure, merely the channels a and b, i.e., the $k^{th}$ channel being at least one of the channels a and b, are migrated, so as to maintain the brightness of the image while correcting the color cast.

Figure 24:
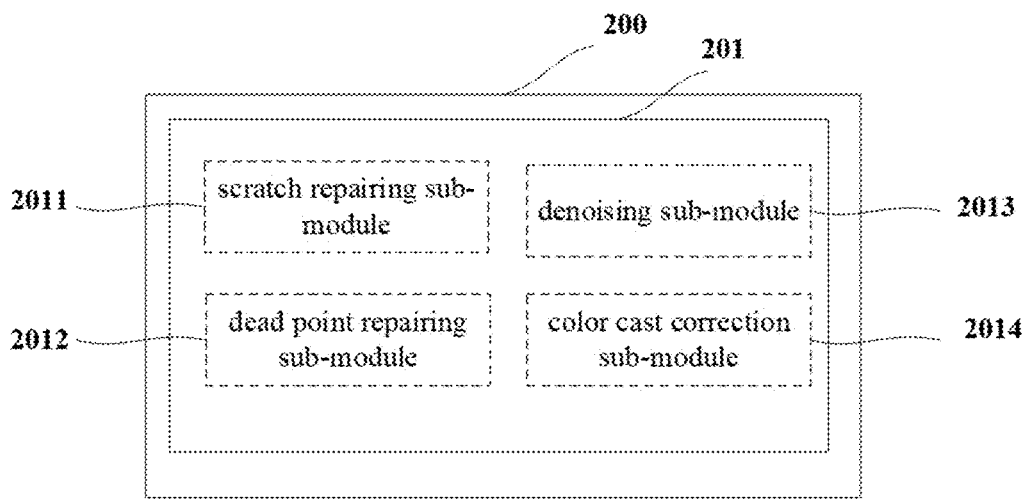
FIG. 24 is a schematic view showing an image processing device according to an embodiment of the present disclosure.

As shown in FIG. 24, the present disclosure further provides in some embodiments an image processing device 200, which include a processing module 201 including at least one of: a scratch repairing sub-module 2011 configured to subject the to-be-processed video frame to scratch removal to obtain a first image, perform variance calculation on the to-be-processed video frame and the first image to obtain a variance image, process the variance image to obtain a scratch image where merely a scratch is reserved, and obtain a scratch-repaired image in accordance with the to-be-processed video frame and the scratch image; a dead point repairing sub-module 2012 configured to obtain consecutive $N_1$ video frames, the $N_1$ video frames including the to-be-processed video frame, at least one video frame before the to-be-processed video frame and at least one video frame after the to-be-processed video frame, filter the to-be-processed video frame in accordance with the $N_1$ video frames to obtain a dead-point-repaired image, and subject the dead-point-repaired image to artifact removal in accordance with the at least one video frame before the to-be-processed video frame and the at least one video frame after the to-be-processed video frame to obtain an artifact-repaired image; a denoising sub-module 2013 configured to denoise the to-be-processed video frame through a denoising network, the denoising network being obtained through obtaining a target non-movement mask in accordance with consecutive $N_2$ video frames including a to-be-denoised video frame, and training a to-be-trained denoising network in accordance with the $N_2$ video frame and the target non-movement mask to obtain the denoising network; and a color cast correction sub-module 2014 configured to determine respective target color cast values of RGB channels of the to-be-processed video frame, perform color balance adjustment on the to-be-processed video frame to obtain a first corrected image, and perform color migration on the first corrected image in accordance with a reference image to obtain a second corrected image.

In a possible embodiment of the present disclosure, when subjecting the to-be-processed video frame to scratch removal, the scratch repairing sub-module is further configured to perform median filtration on the to-be-processed video frame in accordance with at least one of a type of a filter and a type of the scratch in the to-be-processed video frame, so as to obtain the image where the scratch has been removed.

In a possible embodiment of the present disclosure, the performing median filtration on the to-be-processed video frame in accordance with at least one of the type of the filter and the type of the scratch in the to-be-processed video frame includes selecting a corresponding type of a filter in accordance with the type of the scratch in the to-be-processed video frame, so as to perform median filtration on the to-be-processed video frame. When the scratch in the to-be-processed video frame is a vertical scratch, the median filtration is performed on the to-be-processed video frame through a median filter in a horizontal direction, and when the scratch in the to-be-processed video frame is a horizontal scratch, the media filtration is performed on the to-be-processed video frame through a median filter in a vertical direction.

In a possible embodiment of the present disclosure, the performing median filtration on the to-be-processed video frame in accordance with at least one of the type of the filter and the type of the scratch in the to-be-processed video frame includes performing a respective preprocessing on the to-be-processed video frame in accordance with the type of the filter and the type of the scratch in the to-be-processed video frame, and performing median filtration on the to-be-processed video frame. When the median filter in the horizontal direction is adopted and the scratch in the to-be-processed video frame is a non-vertical scratch, the to-be-processed video frame is rotated so as to convert the scratch into a vertical scratch. When the median filter in the vertical direction is adopted and the scratch in the to-be-processed video frame is a non-horizontal scratch, the to-be-processed video frame is rotated so as to convert the scratch into a horizontal scratch.

In a possible embodiment of the present disclosure, the subjecting the to-be-processed video frame to scratch removal includes performing median filtration on the to-be-processed video frame through a median filter having a size of 1×k and/or k×1. The scratch repairing sub-module is further configured to: increase a value of k of the median filter gradually from a predetermined value and perform median filtration on the to-be-processed video frame to obtain a second image; and determine a final value of k in accordance with a filtering effect of the second image.

In a possible embodiment of the present disclosure, the performing variance calculation on the to-be-processed video frame and the first image includes performing variance calculation on the to-be-processed video frame and the first image to obtain a first variance image and/or a second variance image. The first variance image is obtained through subtracting the first image from the to-be-processed video frame, and the second variance image is obtained through subtracting the to-be-processed video frame from the first image. The processing the variance image to obtain the scratch image where merely the scratch is reserved includes processing the first variance image to obtain a first scratch image where merely the scratch is reserved, and/or processing the second variance image to obtain a second scratch image where merely the scratch is reserved. The obtaining the scratch-repaired image in accordance with the to-be-processed video frame and the scratch image includes performing operation on the to-be-processed video frame, the first scratch image and/or the second scratch image to obtain the scratch-repaired image.

In a possible embodiment of the present disclosure, the processing the first variance image to obtain the first scratch image where merely the scratch is reserved includes: performing median filtration on the first variance image through the median filter in the vertical distance and the median filter in the horizontal direction, so as to obtain a first vertically-filtered image and a first horizontally-filtered image; when the scratch in the to-be-processed video frame is the vertical scratch, subtracting the first horizontally-filtered image from the first vertically-filtered image to obtain the first scratch image; and when the scratch in the to-be-processed video frame is the horizontal scratch, subtracting the first vertically-filtered image from the first horizontally-filtered image to obtain the first scratch image. The processing the second variance image to obtain the second scratch image where merely the scratch is reserved includes: performing median filtration on the second variance image through the median filter in the vertical distance and the median filter in the horizontal direction, so as to obtain a second vertically-filtered image and a second horizontally-filtered image; when the scratch in the to-be-processed video frame is the vertical scratch, subtracting the second horizontally-filtered image from the second vertically-filtered image to obtain the second scratch image; and when the scratch in the to-be-processed video frame is the horizontal scratch, subtracting the second vertically-filtered image from the second horizontally-filtered image to obtain the second scratch image.

In a possible embodiment of the present disclosure, the scratch-repaired image is calculated through $I_{deline}=I-L_{white}+L_{black}$, where $I_{deline}$ represents the scratch-repaired image, I represents the to-be-processed video frame, $L_{white}$ represents the first scratch image, and $L_{black}$ represents the second scratch image.

In a possible embodiment of the present disclosure, the dead point repairing sub-module is configured to perform median filtration on the to-be-processed video frame in accordance with the at least one video frame before the to-be-processed video frame and the at least one video frame after the to-be-processed video frame to obtain the dead-point-repaired image.

In a possible embodiment of the present disclosure, the subjecting the dead-point-repaired image to artifact removal in accordance with the at least one video frame before the to-be-processed video frame and the at least one video frame after the to-be-processed video frame to obtain an artifact-repaired image includes downsampling the dead-point-repaired image, the at least one video frame before the to-be-processed video frame and the at least one video frame after the to-be-processed video frame for $N_3-1$ times to obtain downsampled images having $N_3-1$ resolutions, and inputting images having $N_3$ resolutions into the multiscale cascade network for artifact removal so as to obtain the artifact-repaired image. Each of the downsampled images having respective $N_3-1$ resolutions comprises $N_1$ downsampled image frames corresponding to the dead-point-repaired image, the at least one video frame before the to-be-processed video frame, the at least one video frame after the to-be-processed video frame respectively; the images having the $N_3$ resolutions comprise the dead-point-repaired image, the at least one video frame before the to-be-processed video frame, the at least one video frame after the to-be-processed video frame, and the downsampled images having $N_3-1$ resolutions; the multiscale cascade network comprises $N_3$ cascaded sub-networks, and images processed by the $N_3$ cascaded sub-networks are generated respectively on the basis of the images having respective $N_3$ resolutions, where $N_3$ is a positive integer greater than or equal to 2.

In a possible embodiment of the present disclosure, the inputting the images having $N_3$ resolutions into the multiscale cascade network for artifact removal to obtain the artifact-repaired image includes: with respect to a first sub-network in the $N_3$ cascaded sub-networks, downsampling for A-times the dead-point-repaired image, the at least one video frame before the to-be-processed video frame and the at least one video frame after the to-be-processed video frame to obtain $N_1$ first downsampled images, splicing each of the $N_1$ first downsampled images with a corresponding original image to obtain a first spliced image, and inputting the first spliced images into the first sub-network to obtain a first output image; with respect to an intermediate sub-network between the first sub-network and a last sub-network, upsampling an output image from a previous sub-network to obtain a first upsampled image, downsampling for B-times the dead-point-repaired image, the at least one video frame before the to-be-processed video frame and the at least one video frame after the to-be-processed video frame to obtain $N_1$ second downsampled images having a same scale as the first upsampled image, splicing two groups of images to obtain a second spliced image, and inputting the second spliced image into the intermediate sub-network to obtain a second output image, one of the two groups of images including the $N_1$ second downsampled images, and the other of the two groups of images including downsampled images in the $N_1$ second downsampled images other than a downsampled image corresponding to the dead-point-repaired image as well as the first upsampled image; and with respect to the last sub-network, upsampling an output image from a previous sub-network to obtain a second upsampled image having a same scale as the to-be-processed video frame, splicing two groups of images to obtain a third spliced image, and inputting the third spliced image into the last sub-network to obtain the artifact-repaired image, one of the two groups of images including the $N_1$ video frames, and the other of the two groups of images including images in the $N_1$ video frames other than the dead-point-repaired image as well as the second upsampled image.

In a possible embodiment of the present disclosure, the $N_3$ cascaded sub-networks have a same structure but have different parameters.

In each sub-network includes a plurality of 3D convolutional layers, a plurality of deconvolutional layers, and a plurality of 3D average pooling layers.

In a possible embodiment of the present disclosure, $N_3$ is 3, A is 4 and B is 2.

In a possible embodiment of the present disclosure, the multiscale cascade network is obtained through: obtaining consecutive $N_1$ training images, the $N_1$ training images including a to-be-processed training image, at least one training image before the to-be-processed training image, and at least one training image after the to-be-processed training image; performing filtration on the to-be-processed training image in accordance with the $N_1$ training images to obtain a first training image; and training a to-be-training multiscale cascade network in accordance with the first training image, the at least one training image before the to-be-processed training image and the at least one training image after the to-be-processed training image, so as to obtain the trained multiscale cascade network.

In a possible embodiment of the present disclosure, when training the to-be-trained multiscale cascade network, a total loss includes at least one of an image content loss, a color loss, an edge loss and a perceptual loss.

In a possible embodiment of the present disclosure, the total loss is a weighted sum of the image content loss, the color loss, the edge loss and the perceptual loss. The image content $L_1$ loss is calculated through $$l_{content} = \frac{1}{n}\sum_{i=1}^{n}|y_i - \hat{y}_i|,$$

where $I_{content}$ represents the $L_1$ loss, $\hat{y}_i$ represents an artifact-removed training image, $y_i$ represents the first training image, and n represents the quantity of images in one batch.

In a possible embodiment of the present disclosure, the color loss is calculated through $$l_{color} = \frac{1}{n}\sum_{i=1}^{n}\|\text{Blur}(y_i) - \text{Blur}(\hat{y}_i)\|^2,$$

where $I_{color}$ represents the color loss, $\hat{y}_i$ represents the artifact-removed training image, $y_i$ represents the first training image, n represents the quantity of images in one batch, and Blur(x) represents a Gaussian blur function.

In a possible embodiment of the present disclosure, the edge loss is calculated through $$l_{edge} = \frac{1}{n}\sum_{i=1}^{n}\|H_j(y_i) - H_j(\hat{y}_i)\|^2,$$

where $I_{edge}$ represents the edge loss, $\hat{y}_i$ represents the artifact-removed training image, $y_i$ represents the first training image, n represents the quantity of images in one batch, and $H_j(x)$ represents an image edge map extracted by a $j^{th}$ layer of the HED.

In a possible embodiment of the present disclosure, the perceptual loss is calculated through $$l_{feature} = \frac{1}{n}\sum_{i=1}^{n}\|\varphi_j(y_i) - \varphi_j(\hat{y}_i)\|^2,$$

where $I_{feature}$ represents the perceptual loss, $\hat{y}_i$ represents the artifact-removed training image, $y_i$ represents the first training image, n represents the quantity of images in one batch, and $\varphi_j(x)$ represents an image feature map extracted by the $j^{th}$ layer of the HED.

In a possible embodiment of the present disclosure, the training the to-be-trained multiscale cascade network in accordance with the first training image, the at least one training image before the to-be-processed training image and the at least one training image after the to-be-processed training image includes: randomly cutting out an image block from the first training image, and cutting out an image block from each of the at least one training image before the to-be-processed training image and the at least one training image after the to-be-processed training image at a same position, so as to obtain $N_1$ image blocks; and inputting the $N_1$ image blocks into the to-be-trained multiscale cascade network for training.

In a possible embodiment of the present disclosure, the dead point repairing sub-module is configured to perform filtration on the artifact-repaired image in accordance with the to-be-processed video frame and the dead-point-repaired image to obtain an output image.

In a possible embodiment of the present disclosure, the dead point repairing sub-module is configured to perform median filtration on the artifact-repaired image in accordance with the to-be-processed video frame and the dead-point-repaired image to obtain the output image.

In a possible embodiment of the present disclosure, $N_1$ is 3.

In a possible embodiment of the present disclosure, when obtaining the target non-movement mask in accordance with the consecutive $N_2$ video frames, the denoising sub-module is further configured to: obtain a reference image in accordance with the $N_2$ video frames and the target non-movement mask; input the to-be-denoised video frame into the to-be-trained denoising network to obtain a first denoised image; obtain a second denoised image in accordance with the first denoised image and the target non-movement mask; and determine a loss function of the to-be-trained denoising network in accordance with the reference image and the second denoised image, and adjust a parameter of the to-be-trained denoising network in accordance with the loss function to obtain the denoising network.

In a possible embodiment of the present disclosure, the obtaining the reference image in accordance with the $N_2$ video frames and the target non-movement mask includes: grouping each first video frame in the $N_2$ video frames and the to-be-denoised video frame into a sample pair, and inputting the sample pair to the optical flow network to obtain a first optical flow image representing up-and-down movement information and a second optical flow image representing left-and-right movement information, the first video frame being a video frame in the $N_2$ video frames other than the to-be-denoised video frame, the first optical flow image and the second optical flow image each having a resolution of X*Y; calculating the movement mask in each first video frame and the to-be-denoised video frame in accordance with the first optical flow image and the second optical flow image, so as to obtain $N_2-1$ movement masks; obtaining the target non-movement mask in accordance with the $N_2-1$ movement masks.

In a possible embodiment of the present disclosure, the calculating the movement mask in each first video frame and the to-be-denoised video frame in accordance with the first optical flow image and the second optical flow image includes: performing subtraction operation on last X-X1 rows and first X-X1 rows in the first optical map to obtain a first difference image, and subjecting last X1 rows in the first difference image to zero padding to obtain a processed first difference image; performing subtraction operation on last Y-Y1 columns and first Y-Y1 columns in the second optical flow image to obtain a second difference image, and subjecting last Y1 columns in the second difference image to zero padding to obtain a processed second difference image; adding the processed first difference image with the processed second difference image to obtain a third difference image; assigning a pixel in the third difference image whose absolute value is greater than a predetermined threshold as 1, and assigning a pixel in the third difference image whose absolute value is smaller than the predetermined threshold as 0, so as to obtain a binary image; and obtaining the movement mask in accordance with the binary image.

In a possible embodiment of the present disclosure, the obtaining the movement mask in accordance with the binary image includes performing dilation operation on the binary image to obtain the movement mask.

In a possible embodiment of the present disclosure the obtaining the target non-movement mask in accordance with the $N_2-1$ movement masks includes: obtaining $N_2-1$ non-movement masks in accordance with the $N_2-1$ movement masks, the non-movement mask=1–the movement mask; and multiplying the $N_2-1$ non-movement masks to obtain the target non-movement masks.

In a possible embodiment of the present disclosure, the obtaining the reference image in accordance with the $N_2$ video frames and the target non-movement mask includes: multiplying the $N_2$ video frames by the target non-movement mask to obtain $N_2$ products; and summating the $N_2$ products to obtain a resultant sum, and averaging the resultant sum to obtain the reference image.

In a possible embodiment of the present disclosure, the obtaining the second denoised image in accordance with the first denoised image and the target non-movement mask includes multiplying the first denoised image by the target non-movement mask M to obtain the second denoised image.

In a possible embodiment of the present disclosure, $N_2$ is 5 to 9.

In a possible embodiment of the present disclosure, the color cast correction sub-module is configured to determine the target color cast value of each of the RGB channels of the to-be-processed video frame, including: obtain averages of the RGB channels of the to-be-processed video frame; convert the averages of the RGB channels to a Lab color space to obtain color components (1, a, b) in the Lab space corresponding to the averages of the RGB channels respectively; determine color cast degrees (1, 0-a, 0-b) corresponding to averages of the RGB channels in accordance with the color components (1, a, b) in the Lab space; and convert the color cast degrees (1, 0-a, 0-b) to an RGB color space, to obtain target color cast values of the RGB channels.

In a possible embodiment of the present disclosure, the converting the averages of the RGB channels into the Lab color space includes converting the averages of the RGB channels into the XYZ color space to obtain averages in the XYZ color space, and converting the averages in the XYZ color space into the Lab color space. The converting the color cast degrees (1, 0-a, 0-b) into the RGB color space includes covering the color cast degrees into the XYZ color space to obtain color cast degrees in the XYZ color space, and converting the color cast degrees in the XYZ color space into the RGB color space.

In a possible embodiment of the present disclosure, the performing color balance adjustment on the to-be-processed video frame in accordance with the target color cast value to obtain the first corrected image includes performing the color balance adjustment on the to-be-processed video frame through at least one of a highlight function, a shadow function and a midtone function in accordance with the target color cast value of each of the RGB channels. The highlight function and the shadow function are linear functions, and the midtone function is an exponential function.

In a possible embodiment of the present disclosure, the highlight function is $y=a(v)*x+b(v)$, the shadow function is $y=c(v)*x+d(v)$, and the midtone function is $y=x^{f(v)}$, where y represents the first corrected image, x represents the to-be-processed video frame, v is determined in accordance with the target deviation value of each of the RGB channels, and $f(v)$, $a(v)$, $b(v)$, $c(v)$ and $d(v)$ are functions of v.

In a possible embodiment of the present disclosure, $f(v)=e^{-v}$.

In a possible embodiment of the present disclosure, $$a(v) = \frac{1}{1-v}, \text{ and } b(v) = 0.$$

In a possible embodiment of the present disclosure, $$c(v) = \frac{1}{1-v}, \text{ and } d(v) = \frac{-v}{1-v}.$$

In a possible embodiment of the present disclosure, for the R channel, $v=(\Delta R-d)-(\Delta G-d)-(\Delta B-d)$; for the G channel, $v=(\Delta G-d)-(\Delta R-d)-(\Delta B-d)$; and for the B channel, $v=(\Delta B-d)-(\Delta R-d)-(\Delta G-d)$, where $\Delta R$, $\Delta G$ and $\Delta B$ are the target color cast values of the RGB channels respectively, and d is a median obtained after ranking $\Delta R$, $\Delta G$ and $\Delta B$ in accordance a size of the value.

In a possible embodiment of the present disclosure, the performing color migration on the first corrected image in accordance with the reference image to obtain the second corrected image includes: converting the reference image and the first corrected image into the Lab color space; determining averages and standard deviations of the reference image and the first corrected image in the Lab color space; determining a color migration result of a $k^{th}$ channel in the Lab color space in accordance with the averages and the standard deviations of reference image and the first corrected image; and converting the color migration result to the RGB color space to obtain the second corrected image.

In a possible embodiment of the present disclosure, the color migration result is calculated through $$I_k = \frac{\sigma_t^k}{\sigma_s^k}(S_k - \mu_s^k) + \mu_t^k,$$

where $I_k$ represents the color migration result of the $k^{th}$ channel in the Lab color space, t represents the reference image, S represents the first corrected image, $\mu_s^k$ represents an average of the $k^{th}$ channel of the first corrected image, a represents the standard deviation of the $k^{th}$ channel of the first corrected image, $\mu_t^k$ represents the average of the $k^{th}$ channel of the reference image, and $\sigma_t^k$ represents the standard deviation of the $k^{th}$ channel of the reference image.

In a possible embodiment of the present disclosure, the $k^{th}$ channel is at least one of the channels a and b.

The present disclosure further provides in some embodiments an electronic device, including a processor, a memory, and a program or instruction stored in the memory and configured to be executed by the processor. The program or instruction is configured to be executed by the processor so as to implement the steps of the above-mentioned image processing method with a same technical effect.

The present disclosure further provides in some embodiments a machine-readable storage medium storing therein a program or instruction. The program or instruction is executed by a processor so as to implement the steps of the above-mentioned image processing method with a same technical effect, which will not be particularly defined herein.

The processor is a processor in the above-mentioned image processing device. The machine-readable storage medium includes a computer-readable storage medium, e.g., Read-Only Memory (ROM), Random Access Memory (RAM), magnetic disk or optical disk.

It should be further appreciated that, such words as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements. It should be further appreciated that, for the method and device in the embodiments of the present disclosure, the functions are not limited to be achieved through performing the steps in the shown or discussed order, and the functions may also be achieved through performing the steps simultaneously or in a reverse order. For example, the steps of the method may be performed in an order different from that mentioned hereinabove, and some steps may be added, omitted or combined. In addition, the features described with reference to some instances may be combined in the other instance.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., ROM/RAM, magnetic disk or optical disk) and include instructions so as to enable a terminal device (mobile phone, computer, server, air conditioner or network device) to execute the method in the embodiments of the present disclosure.

The embodiments of the present disclosure have been described above in conjunction with the accompanying drawings, but the present disclosure is not limited to the above-mentioned specific embodiments, which are merely illustrative rather than restrictive. Under the teaching of the present disclosure, many forms can be made without departing from the scope of the present disclosure and the protection scope of the claims, which all fall within the protection of the present disclosure.

What is claimed is:

1. An image processing method, characterized by comprising:
performing at least one of following steps on a to-be-processed video frame:
a scratch repairing step of subjecting the to-be-processed video frame to scratch removal to obtain a first image, performing variance calculation on the to-be-processed video frame and the first image to obtain a variance image, processing the variance image to obtain a scratch image where merely a scratch is reserved, and obtaining a scratch-repaired image in accordance with the to-be-processed video frame and the scratch image;
a dead point repairing step of obtaining consecutive $N_1$ video frames, the $N_1$ video frames comprising the to-be-processed video frame, at least one video frame before the to-be-processed video frame and at least one video frame after the to-be-processed video frame, filtering the to-be-processed video frame in accordance with the at least one video frame before the to-be-processed video frame and at least one video frame after the to-be-processed video frame to obtain a dead-point-repaired image, and subjecting the dead-point-repaired image to artifact removal in accordance with the at least one video frame before the to-be-processed video frame and the at least one video frame after the to-be-processed video frame to obtain an artifact-repaired image, $N_1$ being a positive integer greater than or equal to 3;
a denoising step of denoising the to-be-processed video frame through a denoising network, wherein the denoising network is obtained through following steps: obtaining a target non-movement mask in accordance with consecutive $N_2$ video frames comprising a to-be-denoised video frame, and training a to-be-trained denoising network in accordance with the $N_2$ video frame and the target non-movement mask to obtain the denoising network, $N_2$ being a positive integer greater than or equal to 2; and
a color cast correcting step of determining respective target color cast values of RGB channels of the to-be-processed video frame, performing color balance adjustment on the to-be-processed video frame in accordance with the target color cast values to obtain a first corrected image, and performing color migration on the first corrected image in accordance with a reference image to obtain a second corrected image.

2. The image processing method according to claim 1, wherein the subjecting the to-be-processed video frame to the scratch removal comprises:
performing median filtration on the to-be-processed video frame in accordance with at least one of a type of a filter and a type of the scratch in the to-be-processed video frame to obtain an image where the scratch has been removed.

3. The image processing method according to claim 2, wherein the performing median filtration on the to-be-processed video frame in accordance with at least one of the type of the filter and the type of the scratch in the to-be-processed video frame comprises:
performing a respective preprocessing on the to-be-processed video frame in accordance with the type of the filter and the type of the scratch in the to-be-processed video frame, and performing median filtration on the to-be-processed video frame, wherein when the median filter in the horizontal direction is adopted and the scratch in the to-be-processed video frame is a non-vertical scratch, the to-be-processed video frame is rotated to convert the scratch into a vertical scratch; when the median filter in the vertical direction is adopted and the scratch in the to-be-processed video frame is a non-horizontal scratch, the to-be-processed video frame is rotated to convert the scratch into a horizontal scratch;
or
selecting a corresponding type of a filter in accordance with the type of the scratch in the to-be-processed video frame, to perform median filtration on the to-be-processed video frame, wherein when the scratch in the to-be-processed video frame is a vertical scratch, the median filtration is performed on the to-be-processed video frame through a median filter in a horizontal direction; when the scratch in the to-be-processed video frame is a horizontal scratch, the media filtration is performed on the to-be-processed video frame through a median filter in a vertical direction.

4. The image processing method according to claim 1, wherein
the subjecting the to-be-processed video frame to scratch removal comprises: performing median filtration on the to-be-processed video frame through a median filter having a size of 1*k and/or k*1;
prior to subjecting the to-be-processed video frame to the scratch removal, the image processing method further comprises:
increasing a value of k of the median filter gradually from a predetermined value, and performing median filtration on the to-be-processed video frame to obtain a second image;
determining a final value of k in accordance with a filtering effect of the second image.

5. The image processing method according to claim 1, wherein the performing variance calculation on the to-be-processed video frame and the first image to obtain the variance image comprises:
performing the variance calculation on the to-be-processed video frame and the first image to obtain a first variance image and/or a second variance image, wherein the first variance image is obtained through subtracting the first image from the to-be-processed video frame, and the second variance image is obtained through subtracting the to-be-processed video frame from the first image;

the processing the variance image to obtain the scratch image where merely the scratch is reserved comprises: processing the first variance image to obtain a first scratch image where merely the scratch is reserved, and/or processing the second variance image to obtain a second scratch image where merely the scratch is reserved;
the obtaining the scratch-repaired image in accordance with the to-be-processed video frame and the scratch image comprises: performing operation on the to-be-processed video frame, the first scratch image and/or the second scratch image to obtain the scratch-repaired image,
wherein the processing the first variance image to obtain the first scratch image where merely the scratch is reserved comprises:
performing median filtration on the first variance image through the median filter in a vertical distance and the median filter in a horizontal direction, to obtain a first vertically-filtered image and a first horizontally-filtered image;
when the scratch in the to-be-processed video frame is a vertical scratch, subtracting the first horizontally-filtered image from the first vertically-filtered image to obtain the first scratch image; and
when the scratch in the to-be-processed video frame is the horizontal scratch, subtracting the first vertically-filtered image from the first horizontally-filtered image to obtain the first scratch image,
the processing the second variance image to obtain the second scratch image where merely the scratch is reserved comprises:
performing median filtration on the second variance image through the median filter in the vertical distance and the median filter in the horizontal direction, to obtain a second vertically-filtered image and a second horizontally-filtered image;
when the scratch in the to-be-processed video frame is the vertical scratch, subtracting the second horizontally-filtered image from the second vertically-filtered image to obtain the second scratch image; and
when the scratch in the to-be-processed video frame is the horizontal scratch, subtracting the second vertically-filtered image from the second horizontally-filtered image to obtain the second scratch image,
wherein the scratch-repaired image is calculated through:

$$I_{deline}=I-L_{white}+L_{black},$$

where $I_{deline}$ represents the scratch-repaired image, I represents the to-be-processed video frame, $L_{white}$ represents the first scratch image, and $L_{black}$ represents the second scratch image.

6. The image processing method according to claim 1, further comprising performing filtration on the to-be-processed video frame in accordance with the at least one video frame before the to-be-processed video frame and the at least one video frame after the to-be-processed video frame to obtain the dead-point-repaired image by:
performing median filtration on the to-be-processed video frame in accordance with the at least one video frame before the to-be-processed video frame and the at least one video frame after the to-be-processed video frame, to obtain the dead-point-repaired image.

7. The image processing method according to claim 1, wherein the subjecting the dead-point-repaired image to artifact removal in accordance with the at least one video frame before the to-be-processed video frame and the at least one video frame after the to-be-processed video frame to obtain the artifact-repaired image comprises:

downsampling each of the dead-point-repaired image, the at least one video frame before the to-be-processed video frame and the at least one video frame after the to-be-processed video frame for $N_3-1$ times, to obtain downsampled images having respective $N_3-1$ resolutions, and inputting images having respective $N_3$ resolutions into a multiscale cascade network for artifact removal to obtain the artifact-repaired image, wherein each of the downsampled images having respective $N_3-1$ resolutions comprises $N_1$ downsampled image frames corresponding to the dead-point-repaired image, the at least one video frame before the to-be-processed video frame, the at least one video frame after the to-be-processed video frame respectively; the images having the $N_3$ resolutions comprise the dead-point-repaired image, the at least one video frame before the to-be-processed video frame, the at least one video frame after the to-be-processed video frame, and the downsampled images having $N_3-1$ resolutions; the multiscale cascade network comprises $N_3$ cascaded sub-networks, and images processed by the $N_3$ cascaded sub-networks are generated respectively on the basis that the images having respective $N_3$ resolutions, where $N_3$ is a positive integer greater than or equal to 2.

8. The image processing method according to claim 7, wherein the inputting the images having respective $N_3$ resolutions into the multiscale cascade network for artifact removal to obtain the artifact-repaired image comprises:

with respect to a first sub-network in the $N_3$ cascaded sub-networks, downsampling for A-times each of the dead-point-repaired image, the at least one video frame before the to-be-processed video frame and the at least one video frame after the to-be-processed video frame to obtain $N_1$ first downsampled images, splicing each of the $N_1$ first downsampled images with a corresponding original image to obtain a first spliced image, and inputting the first spliced images into the first sub-network to obtain a first output image;

with respect to an intermediate sub-network between the first sub-network and a last sub-network, upsampling an output image from a previous sub-network to obtain a first upsampled image, downsampling for B-times each of the dead-point-repaired image, the at least one video frame before the to-be-processed video frame and the at least one video frame after the to-be-processed video frame to obtain $N_1$ second downsampled images each having a same scale as the first upsampled image, splicing two groups of images to obtain a second spliced image, and inputting the second spliced image into the intermediate sub-network to obtain a second output image, one of the two groups of images being the $N_1$ second downsampled images, and the other of the two groups of images comprising downsampled images in the $N_1$ second downsampled images other than a downsampled image corresponding to the dead-point-repaired image as well as the first upsampled image; and with respect to the last sub-network, upsampling an output image from a previous sub-network to obtain a second upsampled image having a same scale as the to-be-processed video frame, splicing two groups of images to obtain a third spliced image, and inputting the third spliced image into the last sub-network to obtain the artifact-repaired image, one of the two groups of images being the $N_1$ video frames, and the other of the two groups of images comprising images in the $N_1$ video frames other than the dead-point-repaired image as well as the second upsampled image, wherein $N_3$ is 3, A is 4, and B is 2.

9. The image processing method according to claim 7, wherein the $N_3$ cascaded sub-networks have a same structure and different parameters; or each of the sub-networks comprises a plurality of three-dimensional (3D) convolutional layers, a plurality of deconvolutional layers, and a plurality of 3D average pooling layers.

10. The image processing method according to claim 1, wherein a multiscale cascade network is obtained through:

obtaining consecutive $N_1$ training images, the $N_1$ training images comprising a to-be-processed training image, at least one training image before the to-be-processed training image, and at least one training image after the to-be-processed training image;

performing filtration on the to-be-processed training image in accordance with the $N_1$ training images to obtain a first training image;

training a to-be-training multiscale cascade network in accordance with the first training image, the at least one training image before the to-be-processed training image and the at least one training image after the to-be-processed training image, to obtain the trained multiscale cascade network, wherein when training the to-be-trained multiscale cascade network, a total loss comprises at least one of an image content loss, a color loss, an edge loss and a perceptual loss; or the training the to-be-trained multiscale cascade network in accordance with the first training image, the at least one training image before the to-be-processed training image and the at least one training image after the to-be-processed training image comprises:

randomly cutting out an image block from the first training image, and cutting out an image block from each of the at least one training image before the to-be-processed training image and the at least one training image after the to-be-processed training image at a same position, to obtain $N_1$ image blocks; and inputting the $N_1$ image blocks into the to-be-trained multiscale cascade network for training.

11. The image processing method according to claim 10, wherein the total loss is a weighted sum of the image content loss, the color loss, the edge loss and the perceptual loss, wherein the image content loss is calculated through:

$$l_{content} = \frac{1}{n}\sum_{i=1}^{n}|y_i - \hat{y}_i|$$

where $I_{content}$ represents a $L_1$ loss, $\hat{y}_i$ represents an artifact-removed training image, $y_i$ represents the first training image, and n represents a quantity of images in one batch; or wherein the color loss is calculated through:

$$l_{color} = \frac{1}{n}\sum_{i=1}^{n}\|\text{Blur}(y_i) - \text{Blur}(\hat{y}_i)\|^2$$

where $l_{color}$ represents the color loss, $\hat{y}_i$ represents the artifact-removed training image, $y_i$ represents the first training image, n represents the quantity of images in one batch, and Blur(x) represents a Gaussian blur function; or the edge loss is calculated through:

$$l_{edge} = \frac{1}{n}\sum_{i=1}^{n}\|H_j(y_i) - H_j(\hat{y}_i)\|^2$$

where $l_{edge}$ represents the edge loss, $\hat{y}_i$ represents the artifact-removed training image, $y_i$ represents the first training image, n represents the quantity of images in one batch, and $H_j(x)$ represents an image edge map extracted from a $j^{th}$ layer of a Holistically-nested Edge Detection (HED) Network; or the perceptual loss is calculated through:

$$l_{feature} = \frac{1}{n}\sum_{i=1}^{n}\|\varphi_j(y_i) - \varphi_j(\hat{y}_i)\|^2$$

where $l_{feature}$ represents the perceptual loss, $\hat{y}_i$ represents the artifact-removed training image, $y_i$ represents the first training image, n represents the quantity of images in one batch, and $\varphi_j(x)$ represents an image feature map extracted from a $j^{th}$ layer of a Visual Geometry Group (VGG) network.

12. The image processing method according to claim 1, wherein subsequent to obtaining the artifact-repaired image, the image processing method further comprises:
performing filtration on the artifact-repaired image in accordance with the to-be-processed video frame and the dead-point-repaired image to obtain an output image,
wherein the image processing method further comprises performing median filtration on the artifact-repaired image in accordance with the to-be-processed video frame and the dead-point-repaired image to obtain the output image.

13. The image processing method according to claim 1, wherein $N_1$ is 3; or
the training the to-be-trained denoising network in accordance with the $N_2$ video frames and the target non-movement mask to obtain the denoising network comprises:
obtaining a reference image in accordance with the $N_2$ video frames and the target non-movement mask;
inputting the to-be-denoised video frame into the to-be-trained denoising network to obtain a first denoised image;
obtaining a second denoised image in accordance with the first denoised image and the target non-movement mask;
determining a loss function of the to-be-trained denoising network in accordance with the reference image and the second denoised image, and adjusting a parameter of the to-be-trained denoising network in accordance with the loss function to obtain the denoising network,
wherein the obtaining the second denoised image in accordance with the first denoised image and the target non-movement mask comprises:
multiplying the first denoised image by the target non-movement mask to obtain the second denoised image.

14. The image processing method according to claim 1, wherein the to-be-denoised video frame is an intermediate video frame of the $N_2$ video frames.

15. The image processing method according to claim 1, wherein the obtaining the target non-movement mask in accordance with the consecutive $N_2$ video frames comprises:
grouping each first video frame in the $N_2$ video frames and the to-be-denoised video frame into a sample pair, and inputting the sample pair to the optical flow network to obtain a first optical flow image representing up-and-down movement information and a second optical flow image representing left-and-right movement information, the first video frame being a video frame in the $N_2$ video frames other than the to-be-denoised video frame;
determining a movement mask in the to-be-denoised video frame and each first video frame in accordance with the first optical flow image and the second optical flow image, to obtain $N_2-1$ movement masks;
obtaining the target non-movement mask in accordance with the $N_2-1$ movement masks.

16. The image processing method according to claim 15, wherein the first optical flow image and the second optical flow image each have a resolution of X*Y, and the determining the movement mask in the to-be-denoised video frame and each first video frame in accordance with the first optical flow image and the second optical flow image comprises:
performing subtraction operation on last X-X1 rows and first X-X1 rows in the first optical map to obtain a first difference image, and subjecting last X1 rows in the first difference image to zero padding to obtain a processed first difference image;
performing subtraction operation on last Y-Y1 columns and first Y-Y1 columns in the second optical flow image to obtain a second difference image, and subjecting last Y1 columns in the second difference image to zero padding to obtain a processed second difference image;
adding the processed first difference image with the processed second difference image to obtain a third difference image;
assigning a pixel in the third difference image whose absolute value is greater than a predetermined threshold as 1, and assigning a pixel in the third difference image whose absolute value is smaller than the predetermined threshold as 0, to obtain a binary image; and
obtaining the movement mask in accordance with the binary image,
wherein the obtaining the movement mask in accordance with the binary image comprises:
performing dilation operation on the binary image to obtain the movement mask.

17. The image processing method according to claim 15, wherein the obtaining the target non-movement mask in accordance with the $N_2-1$ movement masks comprises:
obtaining $N_2-1$ non-movement masks in accordance with the $N_2-1$ movement masks, wherein the non-movement mask=1-the movement mask; and
multiplying the $N_2-1$ non-movement masks to obtain the target non-movement masks; or
the obtaining the reference image in accordance with the $N_2$ video frames and the target non-movement mask comprises:
multiplying each of the $N_2$ video frames by the target non-movement mask to obtain $N_2$ products; and summating the $N_2$ products to obtain a resultant sum, and averaging the resultant sum to obtain the reference image.

18. The image processing method according to claim 1, wherein $N_2$ is 5 to 9; or the determining the target color cast value of each of the RGB channels of the to-be-processed video frame comprises:

obtaining averages of the RGB channels of the to-be-processed video frame;

converting the respective averages of the RGB channels to a Lab color space to obtain color components in the Lab space corresponding to the averages of the RGB channels respectively;

determining color cast degrees corresponding to averages of the RGB channels in accordance with the color components in the Lab space; and converting the color cast degrees to an RGB color space, to obtain target color cast values of the RGB channels, wherein the converting the averages of the RGB channels into the Lab color space comprises: converting the averages of the RGB channels into the XYZ color space to obtain averages in the XYZ color space, and converting the averages in the XYZ color space into the Lab color space;

the converting the color cast degrees into the RGB color space comprises: covering the color cast degrees into the XYZ color space to obtain color cast degrees in the XYZ color space, and converting the color cast degrees in the XYZ color space into the RGB color space; or wherein the performing color balance adjustment on the to-be-processed video frame in accordance with the target color cast value to obtain the first corrected image comprises:

performing the color balance adjustment on the to-be-processed video frame through at least one of a highlight function, a shadow function and a midtone function in accordance with the target color cast value of each of the RGB channels, wherein the highlight function and the shadow function are linear functions, and the midtone function is an exponential function, wherein the highlight function is $y=a(v)*x+b(v)$;

the shadow function is $y=c(v)*x+d(v)$;

the midtone function is $y=x^{f(v)}$, where y represents the first corrected image, x represents the to-be-processed video frame, v is determined in accordance with the target deviation value of each of the RGB channels, and $f(v)$, $a(v)$, $b(v)$, $c(v)$ and $d(v)$ are functions of v, wherein $$f(v) = e^{-v}, a(v) = \frac{1}{1-v}, \text{ and } b(v) = 0, c(v) = \frac{1}{1-v},$$

$$\text{and } d(v) = \frac{-v}{1-v},$$

wherein for the R channel, $v=(\Delta R-d)-(\Delta G-d)-(\Delta B-d)$;
for the G channel, $v=(\Delta G-d)-(\Delta R-d)-(\Delta B-d)$;
for the B channel, $v=(\Delta B-d)-(\Delta R-d)-(\Delta G-d)$,
where $\Delta R$, $\Delta G$ and $\Delta B$ represent the target color cast values of the RGB channels respectively, and d represents a median obtained after ranking $\Delta R$, $\Delta G$ and $\Delta B$ in accordance a size of the value.

19. The image processing method according to claim 1, wherein the performing color migration on the first corrected image in accordance with the reference image to obtain the second corrected image comprises:

converting the reference image and the first corrected image into a Lab color space;

determining averages and standard deviations of the reference image and the first corrected image in the Lab color space;

determining a color migration result of a $k^{th}$ channel in the Lab color space in accordance with the averages and the standard deviations of the reference image and the first corrected image;

converting the color migration result to a RGB color space to obtain the second corrected image, wherein the color migration result is calculated through:

$$I_k = \frac{\sigma_t^k}{\sigma_s^k}(S_k - \mu_s^k) + \mu_t^k,$$

where $l_k$ represents the color migration result of the $k^{th}$ channel in the Lab color space, t represents the reference image, S represents the first corrected image, $\mu_s^k$ represents an average of the $k^{th}$ channel of the first corrected image, $\sigma_s^k$ represents the standard deviation of the $k^{th}$ channel of the first corrected image, $u_t^k$ represents the average of the $k^{th}$ channel of the reference image, and $\sigma_t^k$ represents the standard deviation of the $k^{th}$ channel of the reference image, wherein the $k^{th}$ channel is at least one of the channels a and b.

20. An electronic device, comprising a processor, a memory, and a program or instruction stored in the memory and configured to be executed by the processor, wherein when the program or instruction is executed by the processor, the steps of the image processing method according to claim 1 are implemented.

* * * * *